United States Patent
Limberg

(10) Patent No.: US 9,647,865 B1
(45) Date of Patent: May 9, 2017

(54) ITERATIVE-DIVERSITY COFDM BROADCASTING WITH IMPROVED SHAPING GAIN

(71) Applicant: Allen LeRoy Limberg, Port Charlotte, FL (US)

(72) Inventor: Allen LeRoy Limberg, Port Charlotte, FL (US)

(*) Notice: Subject to any disclaimer, the term of this patent is extended or adjusted under 35 U.S.C. 154(b) by 0 days.

(21) Appl. No.: 15/213,569

(22) Filed: Jul. 19, 2016

Related U.S. Application Data

(60) Provisional application No. 62/312,231, filed on Mar. 23, 2016.

(51) Int. Cl.
| | |
|---|---|
| H04L 27/26 | (2006.01) |
| H04L 27/06 | (2006.01) |
| H04L 1/02 | (2006.01) |
| H04L 27/34 | (2006.01) |
| H04L 5/00 | (2006.01) |
| H04L 1/00 | (2006.01) |
| H04L 5/22 | (2006.01) |
| H04L 1/04 | (2006.01) |

(52) U.S. Cl.
CPC .......... H04L 27/3427 (2013.01); H04L 1/004 (2013.01); H04L 1/0063 (2013.01); H04L 1/04 (2013.01); H04L 5/006 (2013.01); H04L 5/0007 (2013.01); H04L 5/22 (2013.01); H04L 27/265 (2013.01); H04L 27/2646 (2013.01)

(58) Field of Classification Search
USPC ............... 375/267, 262, 316, 340, 341, 347; 455/132, 137
See application file for complete search history.

(56) References Cited

U.S. PATENT DOCUMENTS

| | | | | |
|---|---|---|---|---|
| 7,221,720 | B2* | 5/2007 | Robinson | H04N 21/6112 375/340 |
| 2005/0123076 | A1* | 6/2005 | Walker | H04B 7/0857 375/341 |
| 2013/0028269 | A1* | 1/2013 | Limberg | H04L 1/0066 370/474 |
| 2013/0039442 | A1* | 2/2013 | Smallcomb | H04L 1/007 375/308 |
| 2015/0036759 | A1* | 2/2015 | Piesinger | H04L 27/2698 375/261 |

* cited by examiner

Primary Examiner — Tesfaldet Bocure

(57) ABSTRACT

Transmitter apparatus to broadcast coded orthogonal frequency-division multiplexed (COFDM) radio-frequency carriers conveying low-density parity-check (LPDC) coding transmits the same coded DTV signals twice some time apart. The coded DTV signals of initial transmissions and of final transmissions are mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. Receiver apparatus demaps QAM symbols in the earlier and later transmissions of twice-transmitted COFDM signals and maximal-ratio combines the de-mapping results at bit level, rather than symbol level.

11 Claims, 23 Drawing Sheets

PER PRIOR ART

80 = 35, 45 OR 55

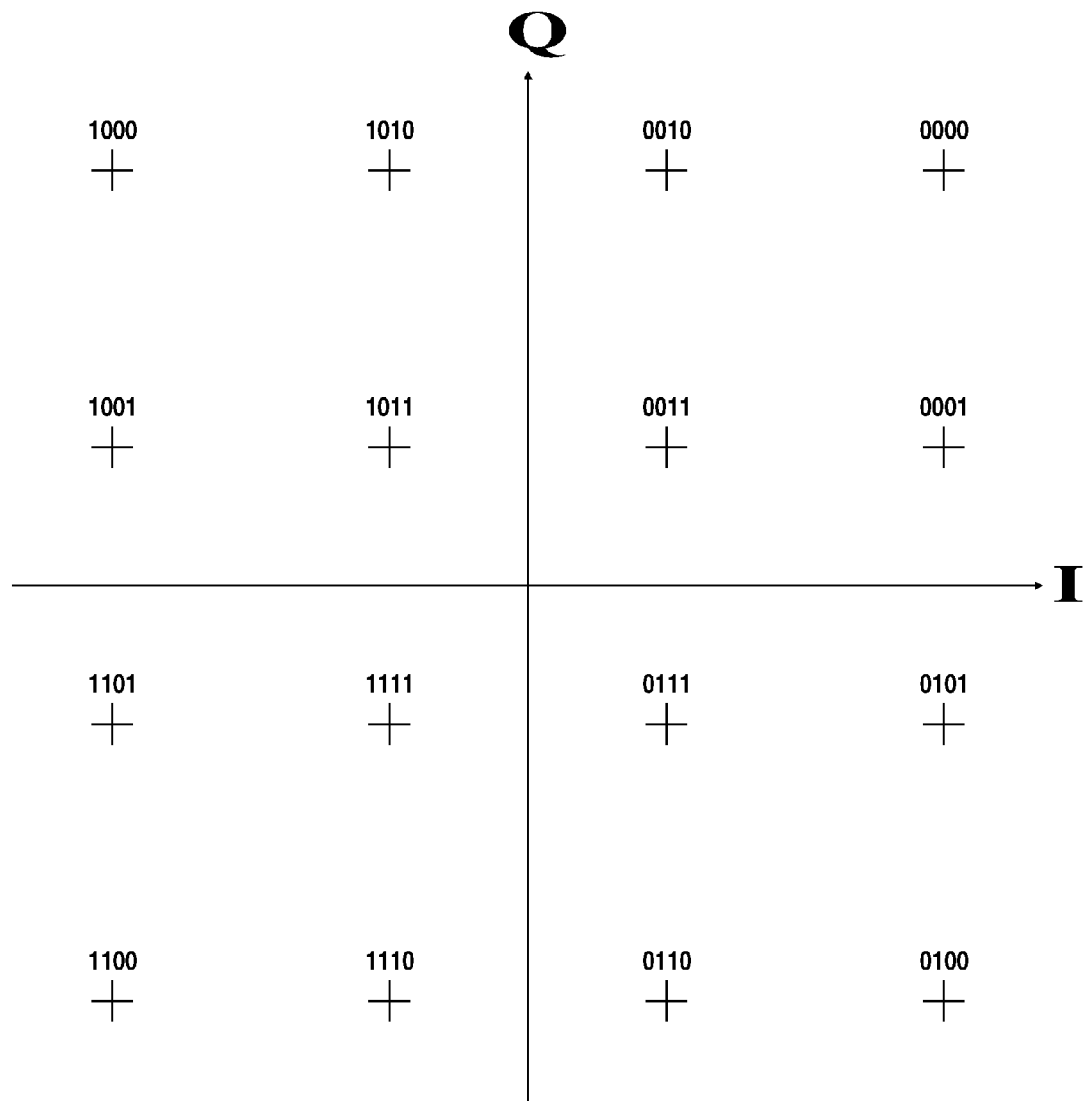
Fig. 8 1st Gray Map of 16QAM
(Conjugate of Fig. 9 2nd Gray Map of 16QAM)

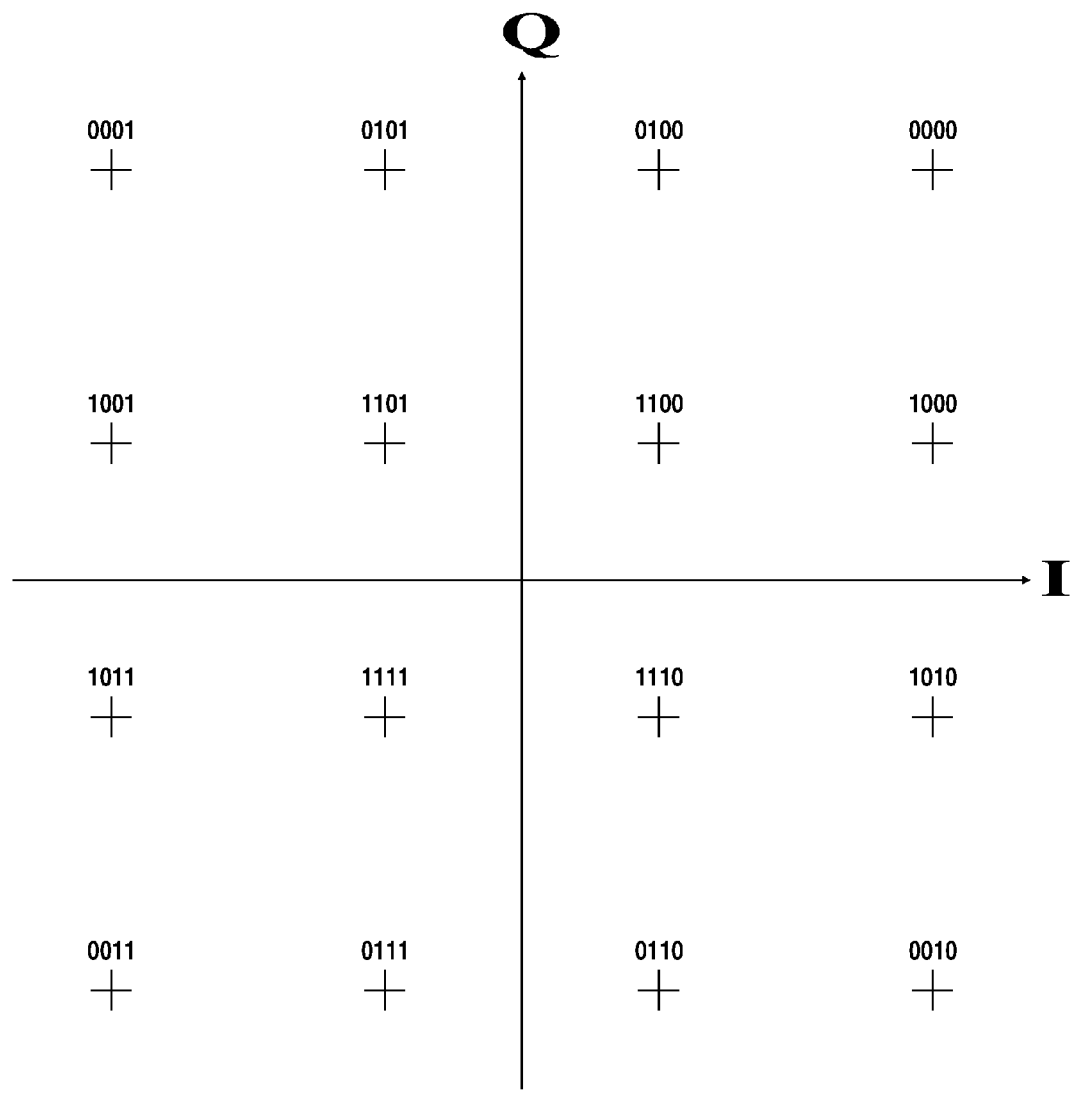
Fig. 9 2nd Gray Map of 16QAM
(Conjugate of Fig. 8 1st Gray Map of 16QAM)

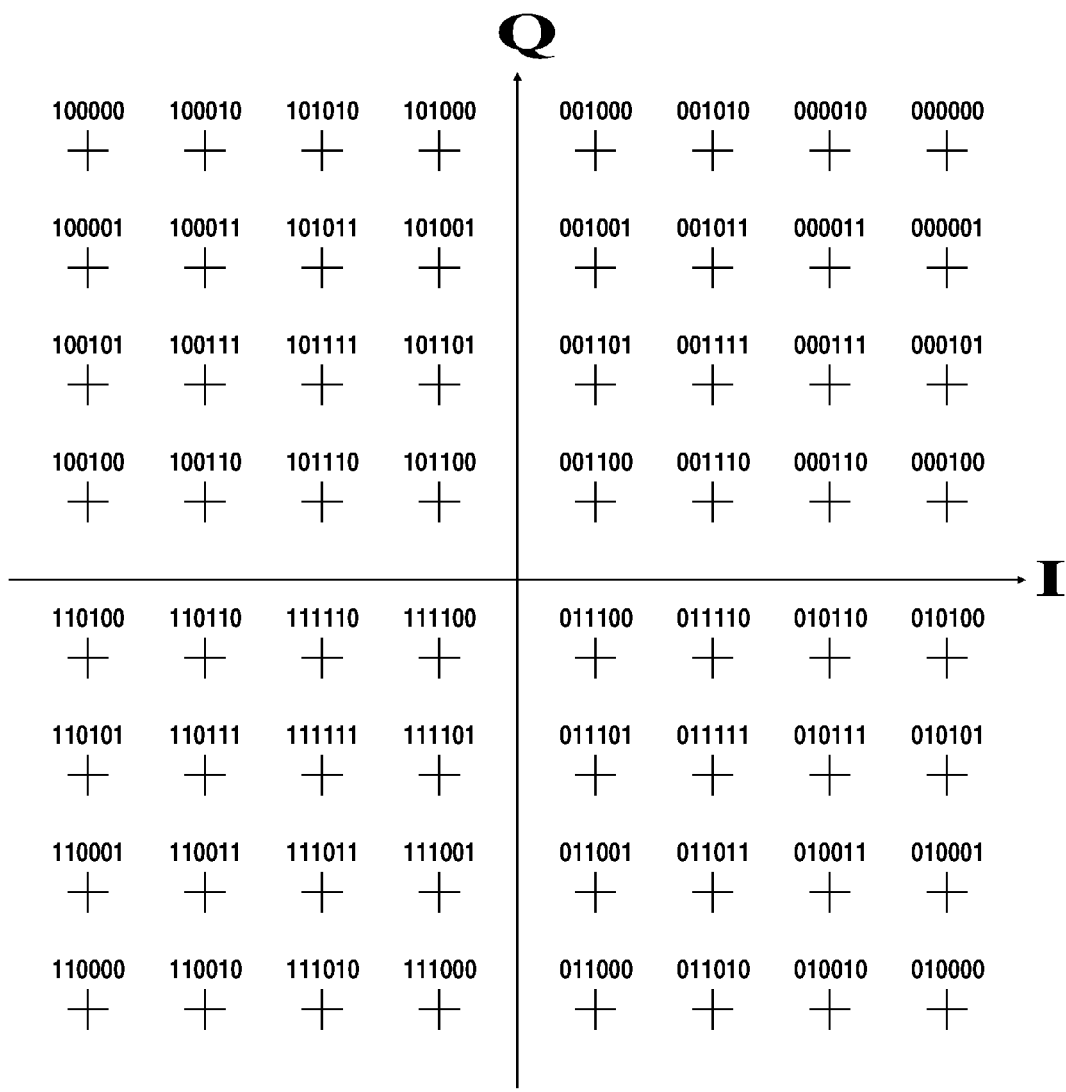
Fig. 10  1st Gray Map of 64QAM
(Conjugate of Fig. 11 2nd Gray Map of 64QAM)

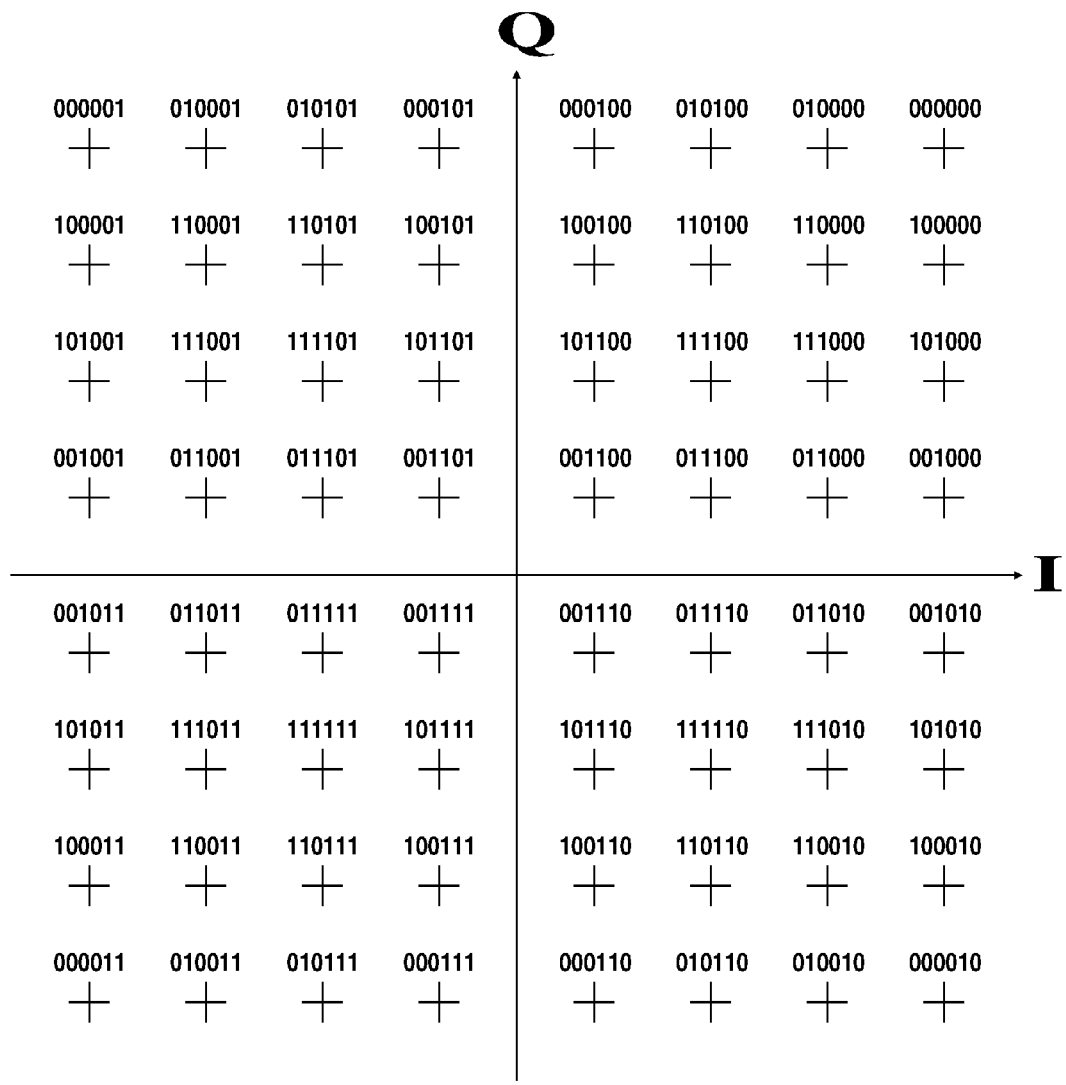
Fig. 11 2nd Gray Map of 64QAM
(Conjugate of Fig. 10 1st Gray Map of 64QAM)

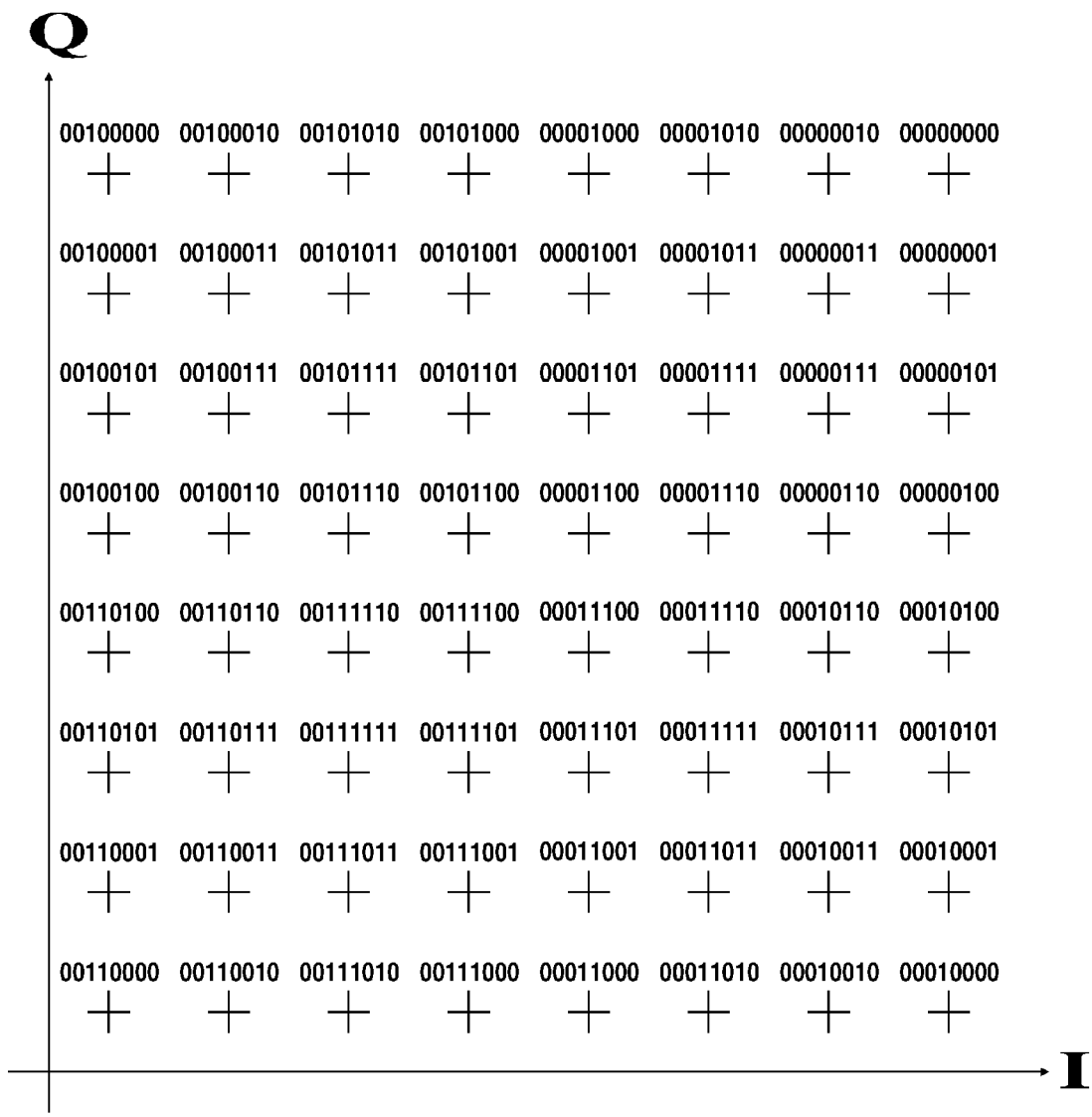
Fig. 12(a) 1st Gray Map of 256QAM
(Conjugate of Fig. 13(a) 2nd Gray Map of 256QAM)

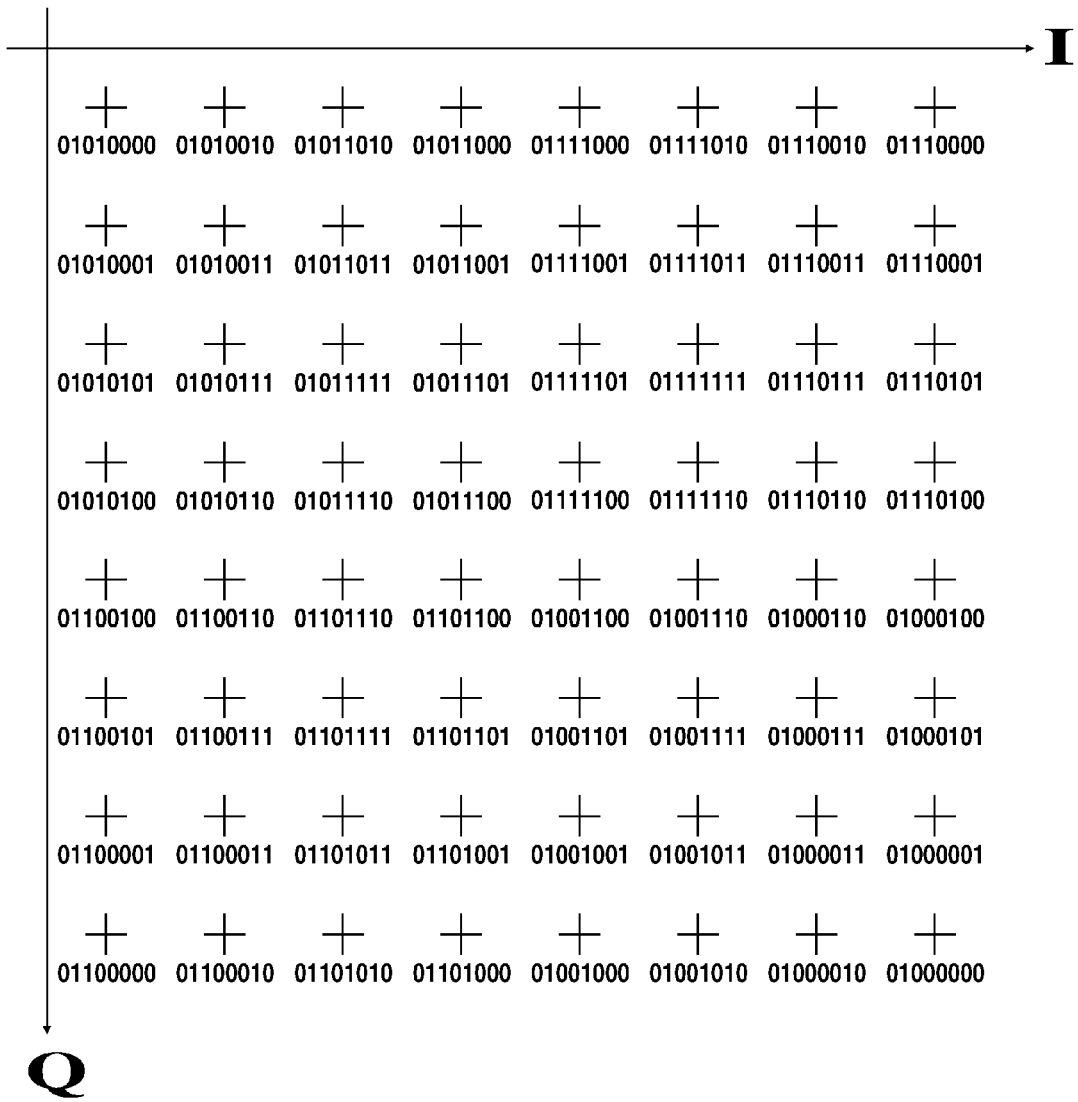
Fig. 12(b) 1st Gray Map of 256QAM
(Conjugate of Fig. 13(b) 2nd Gray Map of 256QAM)

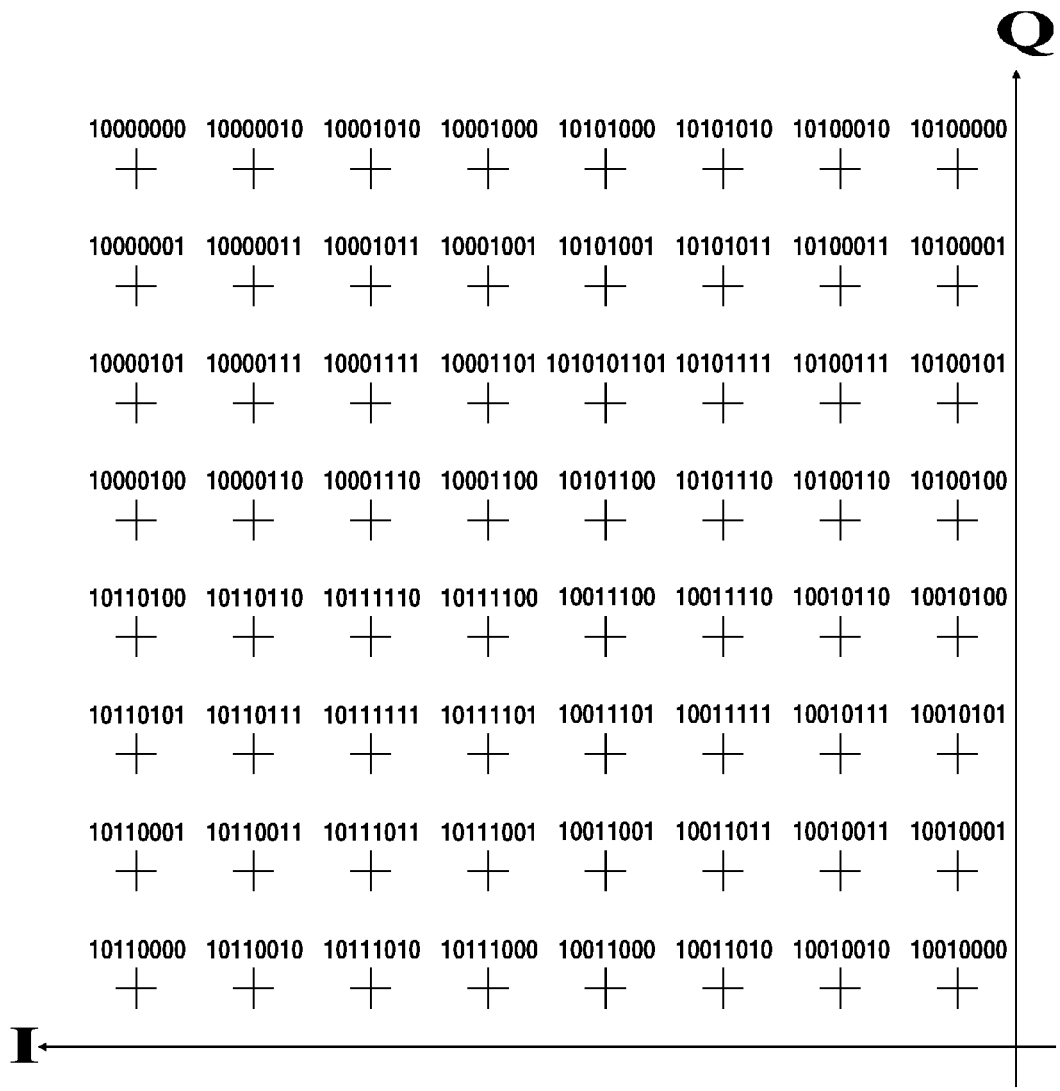
Fig. 12(c) 1st Gray Map of 256QAM
(Conjugate of Fig. 13(c) 2nd Gray Map of 256QAM)

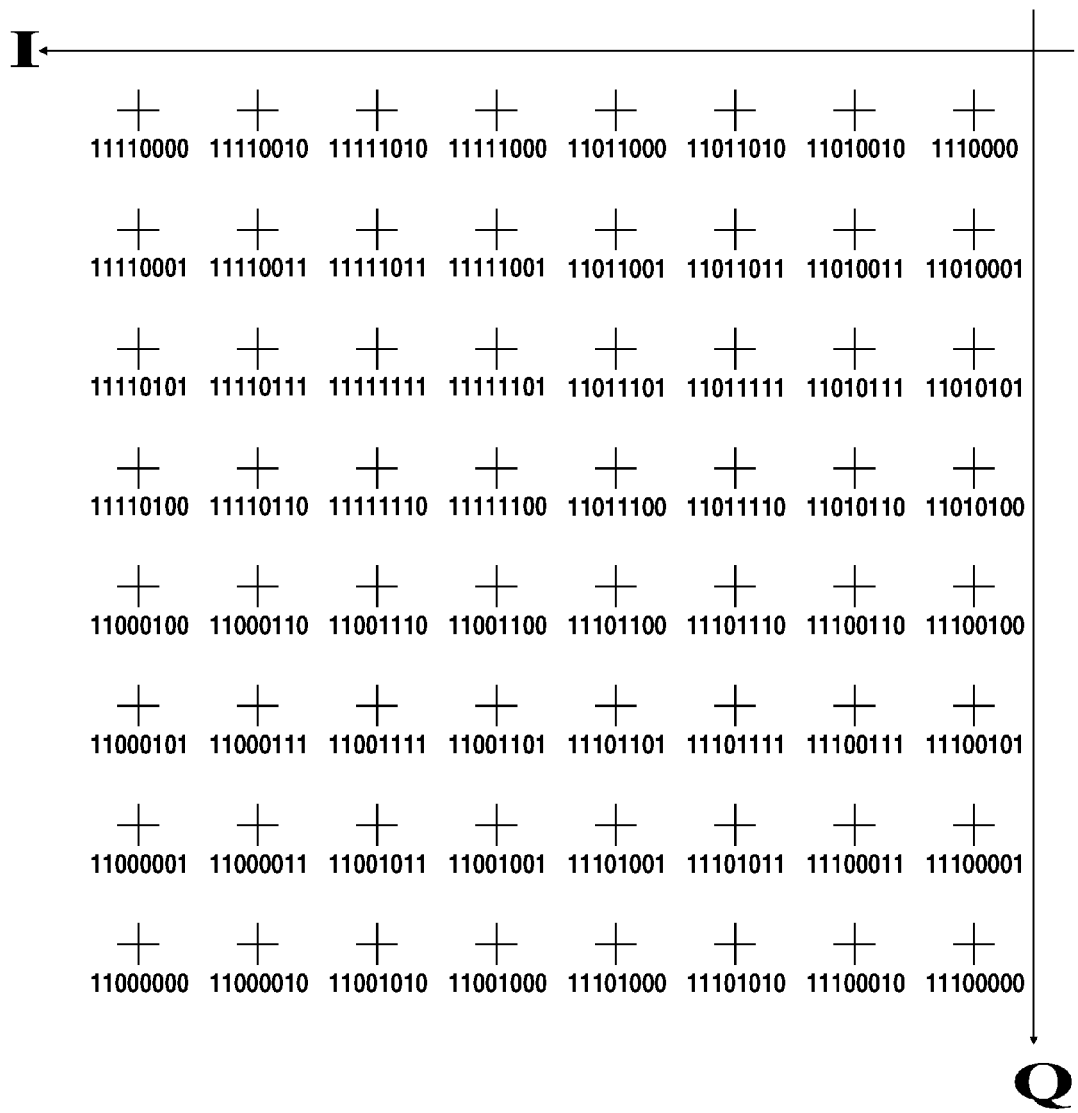
Fig. 12(d) 1st Gray Map of 256QAM
(Conjugate of Fig. 13(d) 2nd Gray Map of 256QAM)

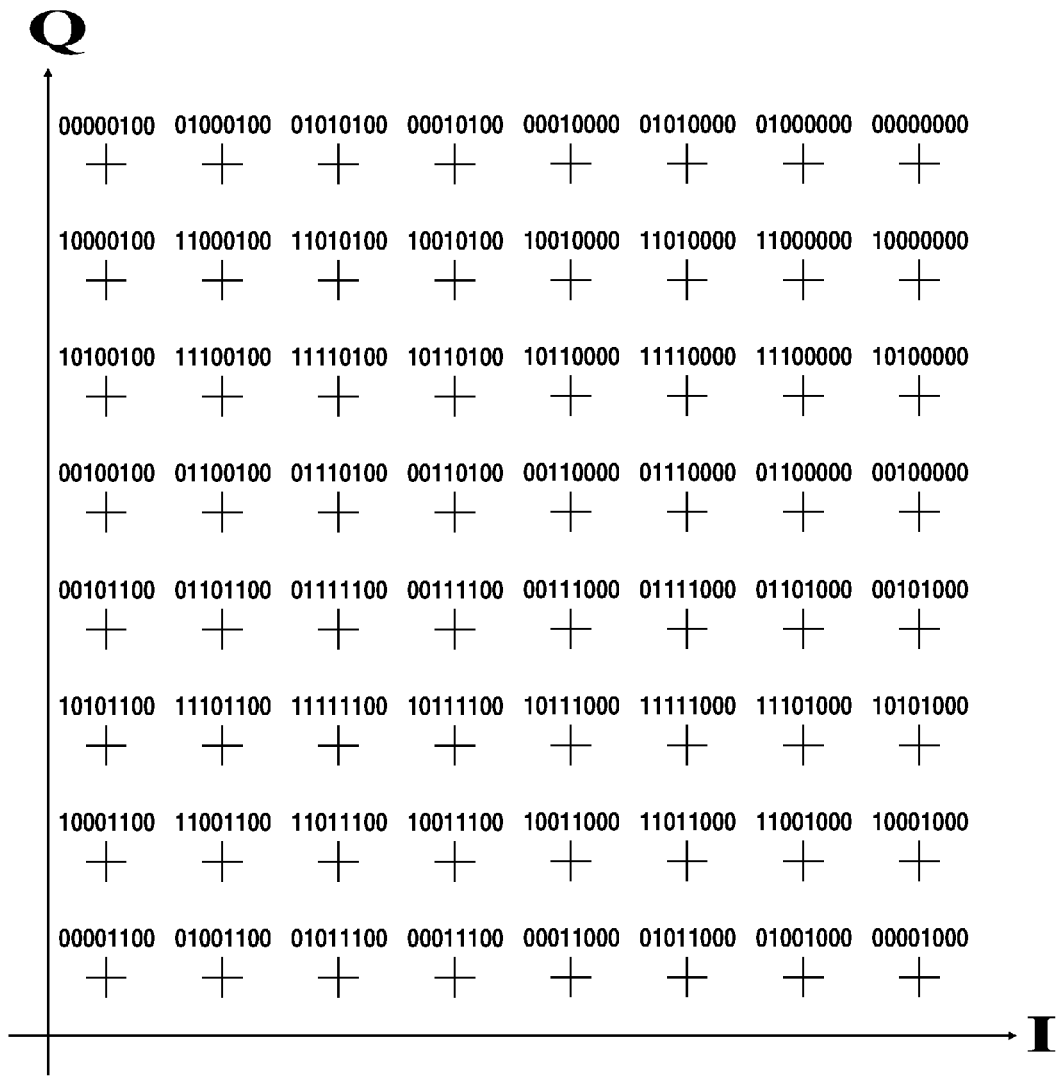
Fig. 13(a) 2nd Gray Map of 256QAM
(Conjugate of Fig. 12(a) 1st Gray Map of 256QAM)

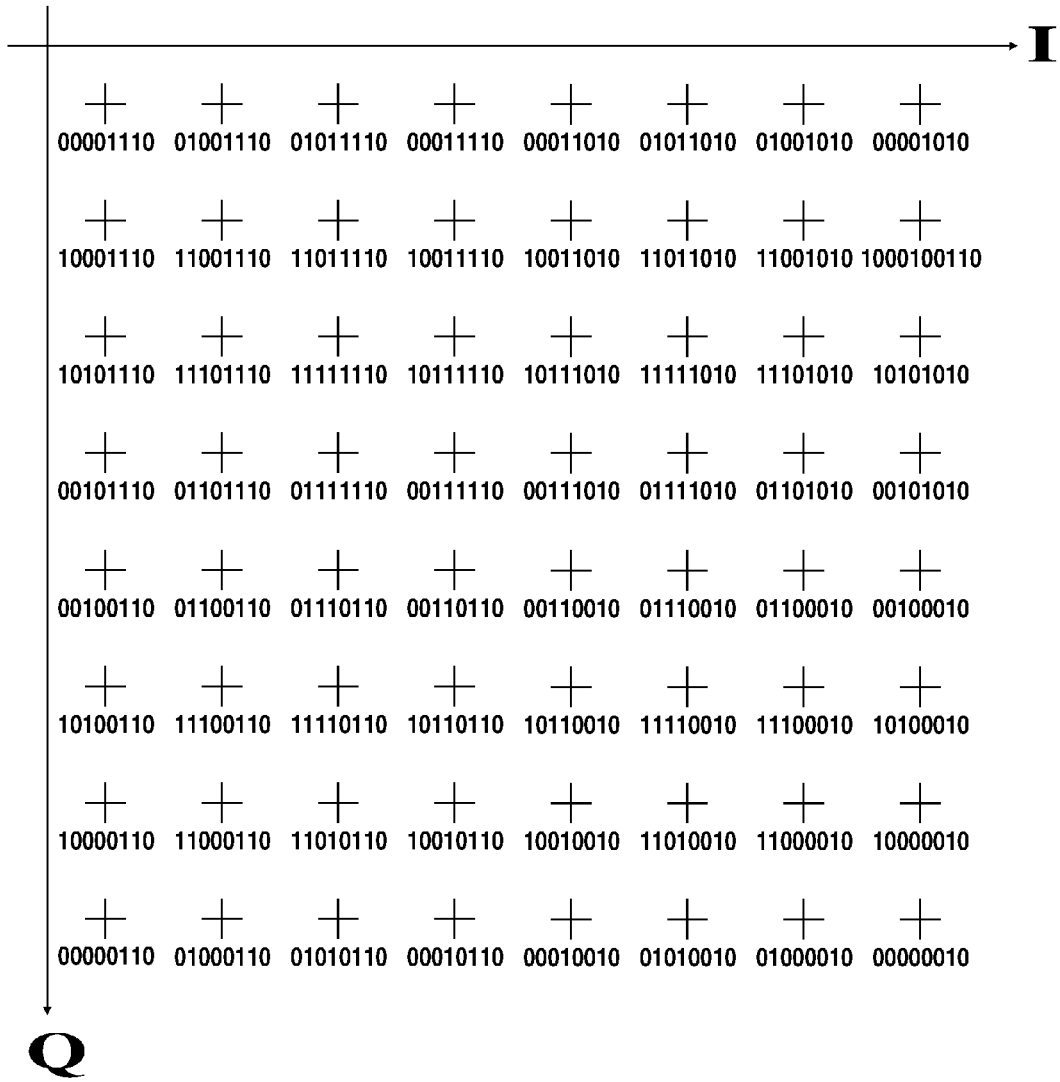
Fig. 13(b) 2nd Gray Map of 256QAM
(Conjugate of Fig. 12(b) 1st Gray Map of 256QAM)

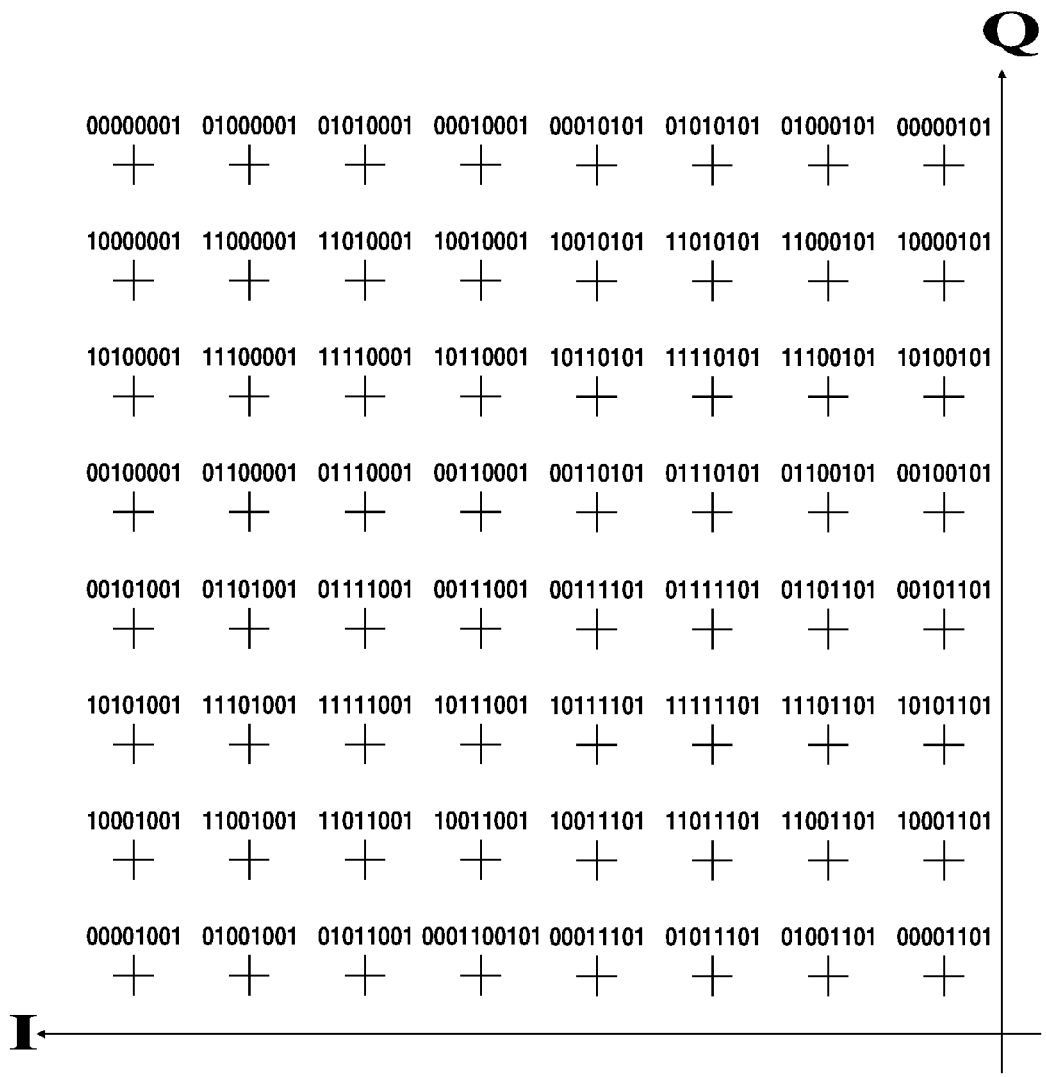
Fig. 13(c) 2nd Gray Map of 256QAM
(Conjugate of Fig. 12(c) 1st Gray Map of 256QAM

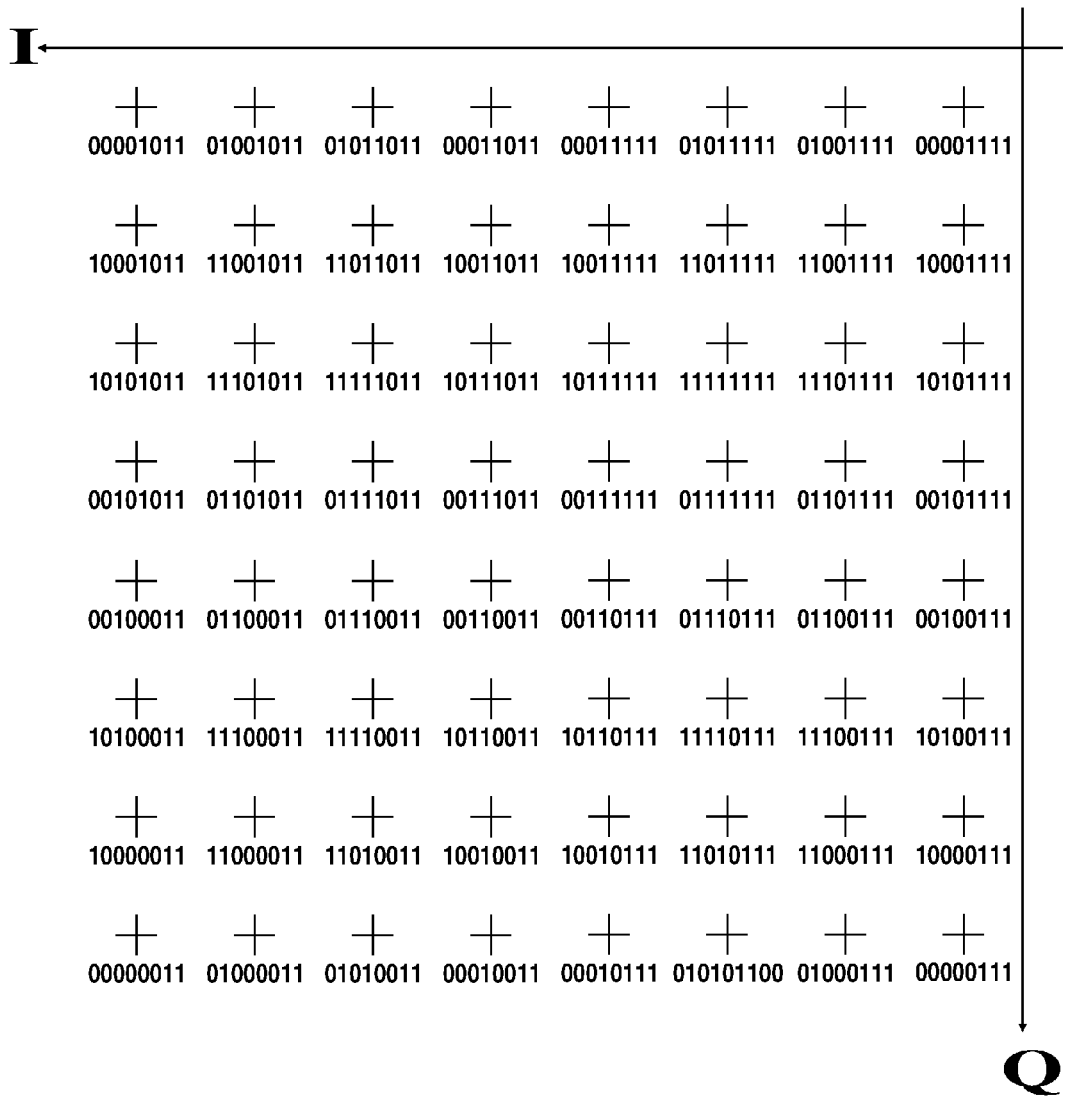
Fig. 13(d) 2nd Gray Map of 256QAM
(Conjugate of Fig. 12(d) 1st Gray Map of 256QAM)

ITERATIVE-DIVERSITY COFDM BROADCASTING WITH IMPROVED SHAPING GAIN

This application claims the benefit of the filing date of U.S. provisional Pat. App. 62/312,231 filed 23 Mar. 2016.

FIELD OF THE INVENTION

Various aspects of the invention relate to systems of over-the-air broadcasting of orthogonal frequency-division modulation (OFDM) digital television (DTV) signals for iterative-diversity reception and particularly to receiver apparatus for such systems.

BACKGROUND OF THE INVENTION

U.S. Pat. No. 8,958,490 titled "COFDM broadcasting with single-time retransmission of COFDM symbols" was granted 17 Feb. 2015 to Allen LeRoy Limberg. U.S. Pat. No. 8,958,490 describes COFDM receivers that decode the FEC coding of initial transmissions and of final transmissions for iterative-diversity reception separately; data packets without error or with as little error as available are then chosen from the results of such separate decoding. U.S. Pat. No. 8,958,490 also describes COFDM receivers that use the plural-input/single-output detectors used in the prior art for plural-antenna spatial-diversity reception, using such detectors for combining initial and final transmissions for iterative-diversity reception. These PISO detectors unmap the QAM of COFDM carriers in those initial and final transmissions, then decode the FEC coding of the unmapping results. Still further, U.S. Pat. No. 8,958,490 describes COFDM receivers that use maximal-ratio code combining of the coordinates of corresponding QAM symbol constellations from initial and final transmissions of similar COFDM signals to implement iterative-diversity reception. The maximal-ratio code combining is done before unmapping those constellations.

Delaying the final transmissions of coded DTV signals up to few seconds respective to the initial transmissions of them allows receivers of suitable design to tolerate deep full-spectrum fades that last up to a few seconds, as sometimes occur in received COFDM signals. Such full-spectrum fading is sometimes referred to as a "drop-out" in received signal strength. COFDM receivers in moving vehicles experience such drop-outs when the receiving site is changed such that a sole effective signal transmission path is blocked by an intervening hill or structure, for example. Because the signaling rate in the individual OFDM carriers is very low, COFDM receivers are capable of maintaining reception despite drop-outs that are only a fraction of a second in duration. However, drop-outs that last a second or more disrupt television reception perceptibly. Automatic gain control of the front-end tuner stages of a DTV receiver will increase their gain, amplifying noise to introduce burst noise into the FEC coding. Such protracted drop-outs are encountered in a vehicular receiver when the vehicle passes through a tunnel, for example. By way of further example of a protracted drop-out in reception, a stationary receiver may experience drop-outs in received signal strength during dynamic multipath reception conditions, such as caused by an aircraft flying over the reception site. Electric motors can generate radio-frequency noise strong enough to overload the front-end tuner stages of a DTV receiver, acting as a jamming signal that obliterates COFDM reception and generates burst noise too long to be corrected by FEC coding.

If a reception site is not more than a few kilometers distant from the COFDM transmitter or transmitters, multipath reception can cause severe frequency-selective fading of a large group of OFDM carriers in a particular portion of the radio-frequency (RF) channel. Frequency-selective fading has been observed that extends over three MHz in a 6-MHz-wide RF channel and reduces the amplitude of a central few of the selectively faded OFDM carriers as much as 35 dB respective to less affected OFDM carriers. Such frequency-selective fading corrupts so many of the QAM symbols used for modulating respective OFDM carriers that de-interleaving of the results of unmapping the QAM symbols is unable to reduce the density of bit errors in the recovered bit-wise FEC coding sufficiently to permit successful decoding thereof. In some circumstances a directional reception antenna may be able to mitigate this problem. However, the whip antenna of a hand-held receiver is apt not to have appreciable capability for rejecting co-channel interference.

U.S. Pat. No. 8,958,490 discloses the following procedures to overcome severe frequency-selective fading of a large group of OFDM carriers in a particular portion of the RF channel. COFDM symbols of initial transmissions of the coded DTV data are arranged such that their circular discrete Fourier transforms (DFTs) are rotated one-half revolution respective to the circular DFTs of corresponding COFDM symbols in time-slices of subsequent transmissions of that same DTV data. DTV receivers then de-rotate the COFDM symbols of initial transmissions of the DTV data and after delaying the resulting COFDM symbols combine them with COFDM symbols of subsequent transmissions of that same DTV data. Such DTV receivers are capable of overcoming severe frequency-selective fading that is apt to be caused by multipath reception from nearby DTV transmitters, as well as overcoming protracted severe flat-spectral fading of one of the initial and subsequent transmissions of the same DTV data. These DTV receivers also better tolerate narrow-band noise affecting only a small portion of the frequency spectrum of the radio-frequency channel.

Transmitting forward-error-correction (FEC) coded data twice separated by some time interval provides a COFDM receiver with additional basis for overcoming randomly occurring short-duration burst noise, besides relying on coding that corrects burst errors. However, retransmitting COFDM symbols without intervening delay, or with intervening delay of only a few OFDM symbol intervals, still facilitates receivers of suitable design better to overcome randomly occurring burst noise of short duration.

U.S. Pat. No. 9,143,375 titled "Iterative-diversity COFDM broadcasting with improved shaping gain" was granted 12 Sep. 2015 to Allen LeRoy Limberg and is incorporated herein by reference. U.S. Pat. No. 9,143,375 prescribes that the coded DTV signals of initial transmissions and of final transmissions be mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. In this specification and the related drawings the two different mappings are referred to as "conjugate mappings" forming a "conjugate pair" of mappings to QAM symbol constellations. Receiver apparatus combines the earlier and later transmissions of twice-transmitted COFDM signals as part of iterative procedures for unmapping QAM and decoding the LDPC coding of each of the DTV signals. Such twice-transmitted COFDM signals cannot be maximal-ratio combined before unmapping the QAM symbols they respectively convey. U.S. Pat. No. 9,143,375 describes each of the twice-transmitted COFDM signals being unmapped, de-interleaved and decoded, with results of the decoding of forward-error-correction coding being selected between on the basis of less likelihood of error. This is a rather complex reception procedure, which can be avoided as described hereinafter.

U.S. Pat. No. 7,236,548 titled "Bit level diversity combining for COFDM system" was granted 26 Jun. 2007 to Monisha Ghosh, Joseph P. Meehan and Xuemei Ouyang. U.S. Pat. No. 7,236,548 describes a wireless communications receiver for similar COFDM signals received concurrently via different antenna elements. Bit level, rather than symbol level, maximal-ratio combining is employed subsequent to unmapping QAM symbol constellations. Combining at the QAM symbol level increases the effective SNR for an AWGN channel by 3 dB, whether done before or after unmapping QAM symbol constellations. U.S. Pat. No. 7,236,548 asserts that maximal-ratio combining at the bit level after unmapping QAM symbol constellations increases the effective SNR for the AWGN channel by an additional 2.5 dB or so when diversity combining the results of unmapping two similar QAM symbol constellations. U.S. Pat. No. 7,236,548 attributes this increase in the effective SNR for the AWGN channel to taking advantage of equalization that is embedded in the decoding process.

SUMMARY OF THE INVENTION

An iterative-diversity receiver embodying the invention is configured for employing bit level, rather than symbol level, maximal-ratio combining subsequent to unmapping QAM symbol constellations in initial transmissions of coded data and QAM symbol constellations in final transmissions of the same coded data. Those data bits that are assigned positions in the map labels of QAM symbol constellations in initial transmissions of data that are more likely to exhibit errors owing to AWGN are assigned positions in the map labels of QAM symbol constellations in final transmissions of data that are less likely to exhibit errors owing to AWGN. Those data bits that are assigned positions in the map labels of QAM symbol constellations in final transmissions of data that are more likely to exhibit errors owing to AWGN are assigned positions in the map labels of QAM symbol constellations in initial transmissions of data that are less likely to exhibit errors owing to AWGN. When data bits from unmapping the QAM symbol constellations in the initial transmissions of data are maximal-ratio combined with corresponding data bits from unmapping the QAM symbol constellations in the final transmissions of data, the likelihood of errors owing to AWGN in the combined bits is no lower than in either of the sets of bits that are combined. In a preferred embodiment of such iterative-diversity receiver, the maximal-ratio combining of bits from labels of QAM symbol constellations in initial transmissions of coded data with bits from labels of corresponding QAM symbol constellations in final transmissions of the same coded data is modified to implement a degree of selective diversity combining.

BRIEF DESCRIPTION OF THE DRAWINGS

FIG. 8 is a first Gray mapping of 16QAM symbol constellations as may be respectively employed by the first one of a conjugate pair of mappers to 16QAM symbol constellations in the FIG. 2 portion of the COFDM transmitter apparatus depicted in FIGS. 1, 2, 3 and 4.

FIG. 9 is a second Gray mapping of 16QAM symbol constellations as may be respectively employed by the second one of a conjugate pair of mappers to 16QAM symbol constellations in the FIG. 2 portion of the COFDM transmitter apparatus depicted in FIGS. 1, 2, 3 and 4.

FIG. 10 is a first Gray mapping of 64QAM symbol constellations as may be respectively employed by the first one of a conjugate pair of mappers to 64QAM symbol constellations in the FIG. 2 portion of the COFDM transmitter apparatus depicted in FIGS. 1, 2, 3 and 4.

FIG. 11 is a second Gray mapping of 64QAM symbol constellations as may be respectively employed by the second one of a conjugate pair of mappers to 64QAM symbol constellations in the FIG. 2 portion of the COFDM transmitter apparatus depicted in FIGS. 1, 2, 3 and 4.

FIGS. 12(a), 12(b), 12(c) and 12(d) map respective quadrants of a first Gray mapping of 256QAM symbol constellations as may be employed by a first one of a conjugate pair of mappers to 256QAM symbol constellations in Tithe FIG. 2 portion of the COFDM transmitter apparatus depicted in FIGS. 1, 2, 3 and 4.

FIGS. 13(a), 13(b), 13(c) and 13(d) map respective quadrants of a second Gray mapping of 256QAM symbol constellations as may be employed by a second one of a conjugate pair of mappers to 256QAM symbol constellations in the FIG. 2 portion of the COFDM transmitter apparatus depicted in FIGS. 1, 2, 3 and 4.

DETAILED DESCRIPTION

Figure 1:
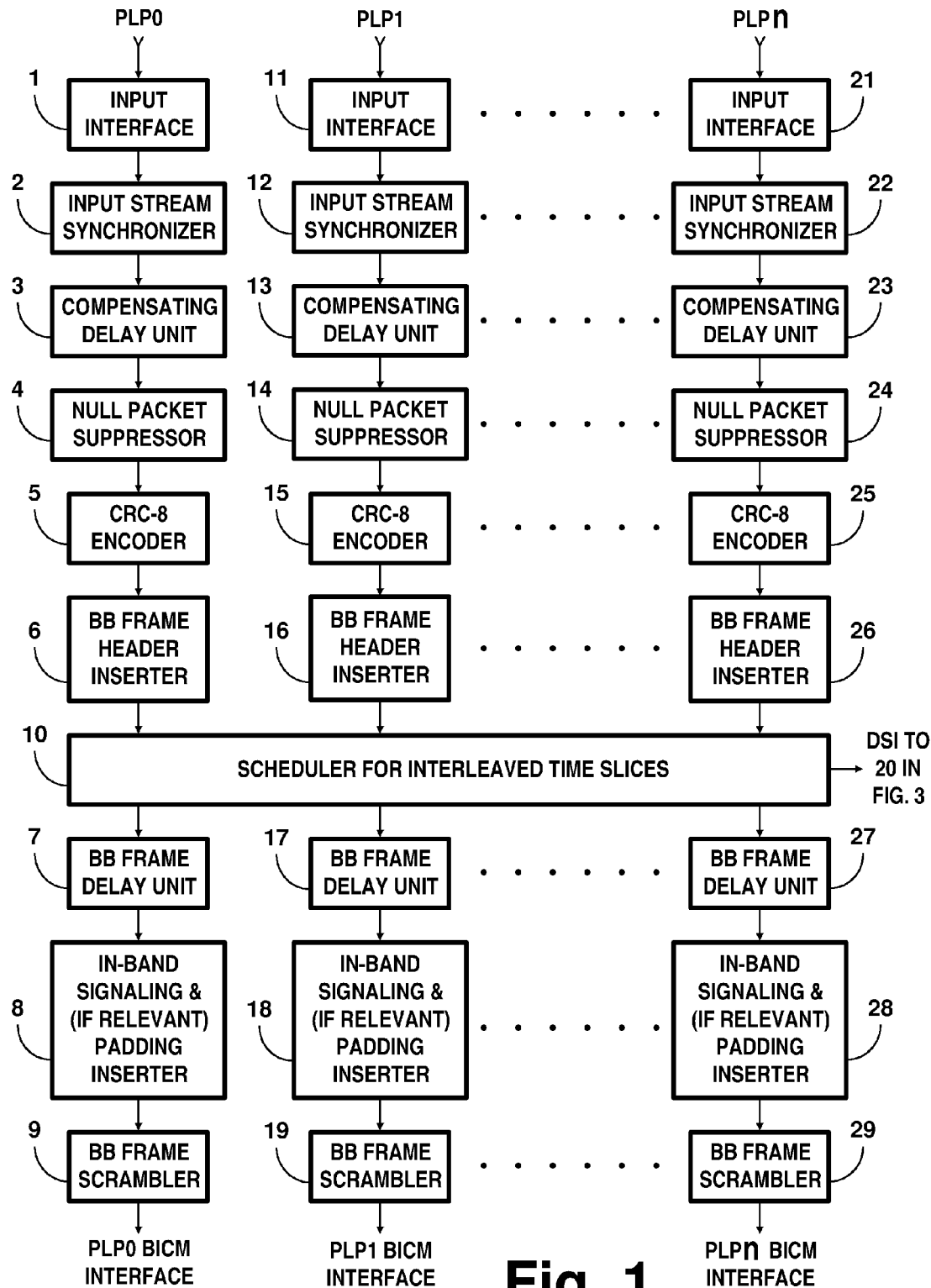
FIGS. 1, 2, 3 and 4 together form a schematic diagram of COFDM transmitter apparatus as described in U.S. Pat. No. 9,143,375, which transmitter apparatus transmits the same coded DTV signal twice with different respective mappings to the QAM of OFDM carriers.
Figure 2:
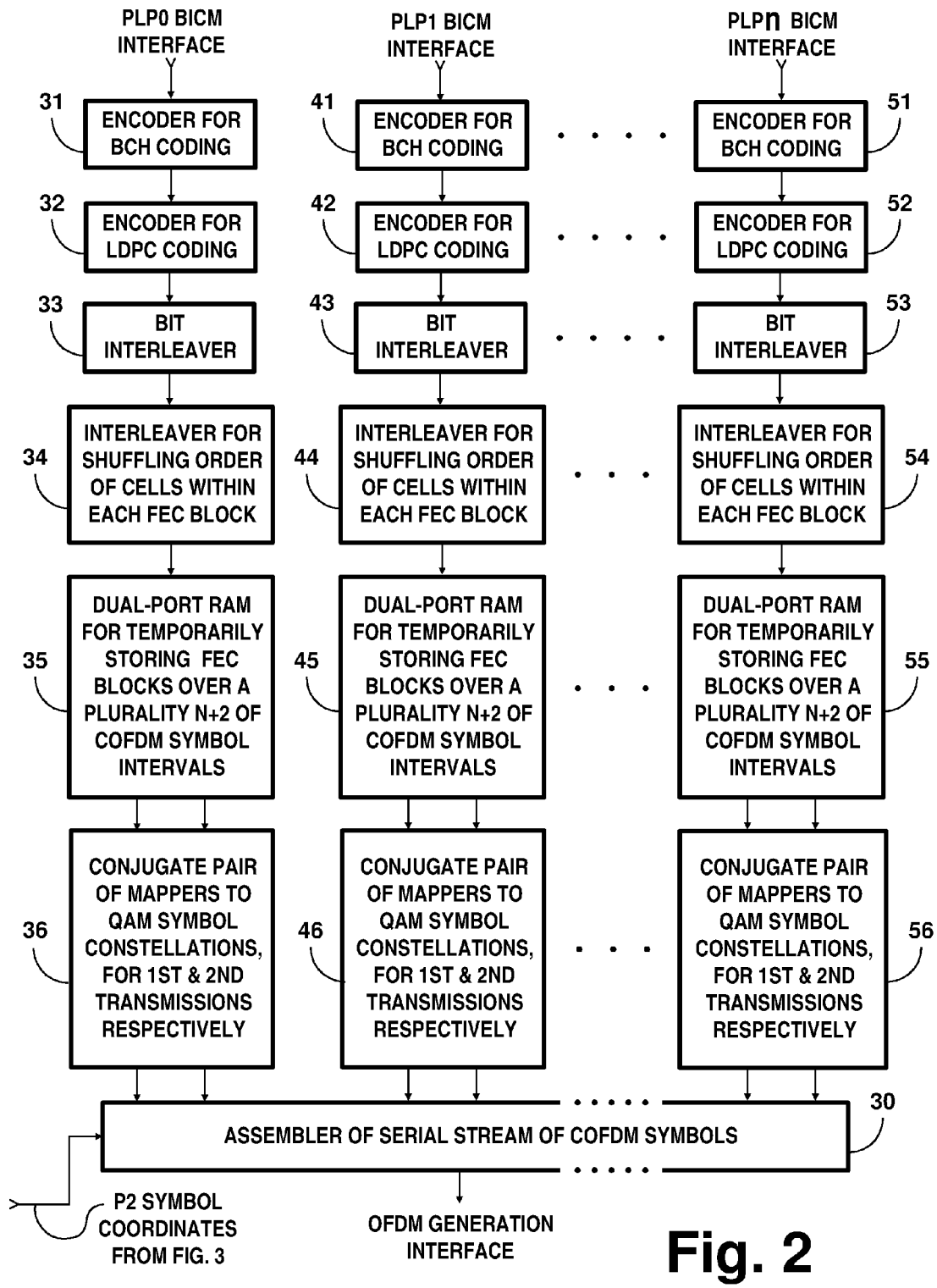
Figure 3:
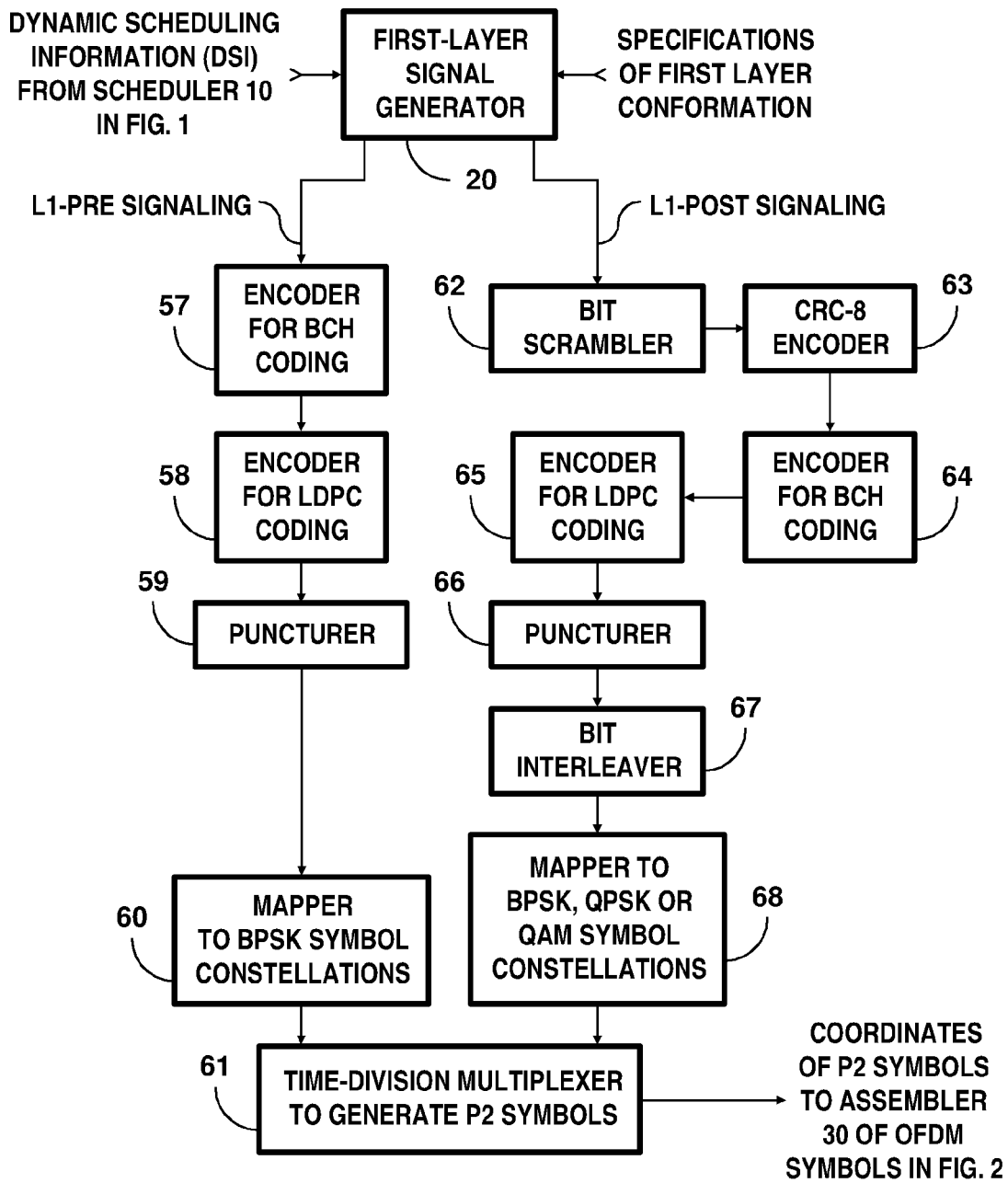
Figure 4:
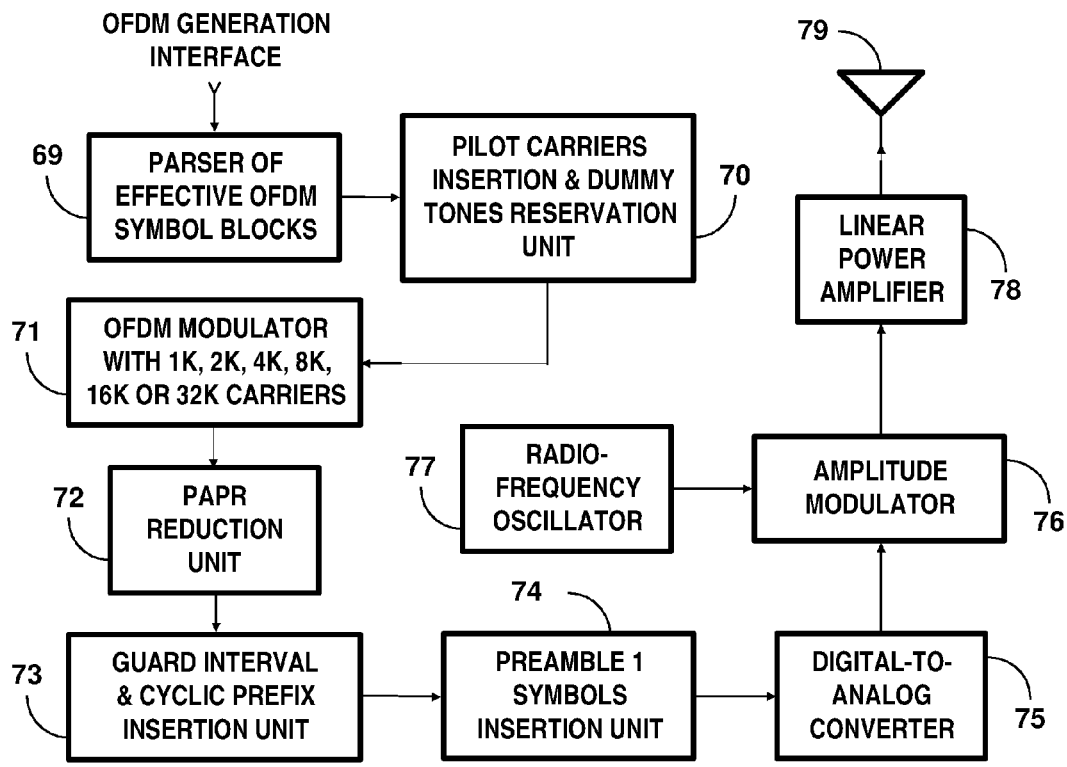

FIGS. 1, 2, 3 and 4 depict a DTV transmitter apparatus generating COFDM signals designed for reception by DTV receivers. FIG. 1 depicts apparatus for generating baseband frames (BBFRAMES) at a Bit-Interleaved Coding and Modulation (BICM) interface. FIG. 2 depicts apparatus for generating bit-wise forward-error-correction (FEC) coding and subsequent COFDM symbol blocks responsive to the BBFRAMEs supplied at the BICM interface. FIG. 3 depicts apparatus for generating bit-wise forward-error-correction (FEC) coding and subsequent COFDM symbol blocks responsive to first layer (L1) conformation specifications and to dynamic scheduling information (DSI). FIG. 4 depicts apparatus for generating and transmitting radio-frequency COFDM signals. Except for the processing of QAM symbol constellations into COFDM symbols, the DTV transmitter apparatus depicted in FIGS. 1, 2, 3 and 4 is essentially the same as specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each T2 frame following the P1 and P2 symbols, but before the data PLP or PLPs. A data PLP may be of a first type transmitted as a single slice per T2 frame, or a data PLP may be of a second type transmitted as a plurality of sub-slices disposed in non-contiguous portions of each T2 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 bit-interleaved coding and modulation (BICM) interface. More specifically, FIG. 1 indicates that a PLP0 stream of digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is not sufficient to completely fill a BBFRAME, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 BICM interface. In practice the delay unit 7, the inserter 8 and the BBFRAME scrambler 9 are realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 bit-interleaved coding and modulation (BICM) interface. More specifically, FIG. 1 indicates that a PLP1 stream of digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data randomizes bits of the BBFRAME supplied from the output port of the BBFRAME scrambler 19 as the PLP1 BICM interface. In practice the delay unit 17, the inserter 18 and the BBFRAME scrambler 19 are realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn bit-interleaved coding and modulation (BICM) interface. More specifically, FIG. 1 indicates that a PLPn stream of digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn BICM interface. In practice the delay unit 27, the inserter 28 and the BBFRAME scrambler 29 are realized by suitable operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate variable bit-rate services in a constant bit-rate TS. In such a case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Programme Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 depicts the (n+1)th physical layer pipe PLP0 further comprising elements 31-36 in cascade connection after the PLP0 BICM interface, but before a respective input port of an assembler 30 for assembling a serial stream of OFDM symbols. More specifically, FIG. 2 depicts an encoder 31 for BCH coding with its input port connected to receive the PLP0 BICM interface signal from the output port of the BBFRAME scrambler 9 and with its output port connected to the input port of an encoder 32 for LDPC coding. FIG. 2 depicts the output port of the encoder 32 for LDPC coding connected to the input port of a bit interleaver 33, the output port of which is connected for applying bit-interleaved bit-wise FEC coding to the input port of a further interleaver 34 that shuffles the order of the QAM symbols in each successive FEC block. This shuffling implements cyclic delay diversity (CDD) that helps the FEC coding to overcome fading. The output port of the interleaver 34 connects to the write-input port of dual-port random-access memory 35. The dual-port RAM 35 is capable of temporarily storing each FEC block for a plurality of OFDM symbol intervals to implement the single-time retransmission of FEC blocks from the (n+1)th physical layer pipe PLP0, as explained in more detail with reference to FIG. 5 further on in this specification. In practice the interleaver 34 (and possibly the bit interleaver 33 as well) may be subsumed into the dual-port RAM 35 by appropriately controlling the read addressing and write addressing thereof.

The two read-output ports of the dual-port RAM 35 connect to respective input ports of a pair 36 of mappers for mapping successive bits of the interleaved bit-wise FEC coding to successive QAM symbol constellations. In the case of transmissions broadcast for reception by stationary DTV receivers, these QAM symbol constellations are apt to be square 256QAM symbol constellations or cruciform 512QAM symbol constellations, by way of specific examples. In the case of transmissions broadcast for reception by mobile DTV receivers, these QAM symbol constellations are apt to be square 16QAM symbol constellations, square 64 QAM symbol constellations or cruciform 128QAM symbol constellations, by way of specific examples. QAM symbol constellations may utilize non-uniform Gray mapping.

Each conjugate pair 36 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP0. A first of the pair 36 of mappers responds to the consecutive segments of the interleaved bit-wise FEC coding in initial transmissions thereof to generate the complex coordinates of successive QAM constellations. A second of the pair 36 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. The complex coordinates of the QAM symbol constellations are supplied from the respective output ports of the pair of 36 of conjugate mappers to respective input ports of an assembler 30 for assembling a stream of OFDM symbols.

FIG. 2 depicts the first physical layer pipe PLP1 further comprising elements 41-46 in cascade connection after the PLP1 BICM interface, but before a respective input port of the assembler 30 for assembling a serial stream of OFDM symbols. More specifically, FIG. 2 depicts an encoder 41 for BCH coding with its input port connected to receive the PLP1 BICM interface signal from the output port of the BBFRAME scrambler 19 and with its output port connected to the input port of an encoder 42 for LDPC coding. FIG. 2 depicts the output port of the encoder 42 for LDPC coding connected to the input port of a bit interleaver 44, the output port of which is connected for applying bit-interleaved bit-wise FEC coding to the input port of a further interleaver 45 that shuffles the order of the QAM symbols in each successive FEC block. This shuffling implements cyclic delay diversity (CDD) that helps the FEC coding to overcome fading. The output port of the interleaver 44 connects to the write-input port of dual-port random-access memory 45. The dual-port RAM 45 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 44 (and possibly the bit interleaver 43 as well) may be subsumed into the dual-port RAM 45 by appropriately controlling the read addressing and write addressing thereof.

The two read-output ports of the dual-port RAM 45 connect separately to respective input ports of a conjugate pair 46 of mappers for mapping successive bits of the interleaved bit-wise FEC coding to successive QAM symbol constellations. Each of the pair 46 of conjugate mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP1. A first of the conjugate pair 46 of mappers responds to the consecutive segments of the interleaved bit-wise FEC coding in initial transmissions thereof to generate the complex coordinates of successive QAM constellations. A second of the conjugate pair 46 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to third and fourth patterns, respectively. Bits that map to lattice points in the third mapping pattern more likely to experience error are mapped to lattice points in the fourth mapping pattern less likely to experience error. Bits that map to lattice points in the fourth mapping pattern more likely to experience error are mapped to lattice points in the third mapping pattern less likely to experience error. The complex coordinates of the QAM symbol constellations are supplied from the respective output ports of the conjugate pair of 46 of mappers to respective input ports of the assembler 30 for assembling a stream of OFDM symbols.

FIG. 2 depicts the (n)th physical layer pipe PLPn further comprising elements 51-56 in cascade connection after the PLPn BICM interface, but before a respective input port of the assembler 30 for assembling a serial stream of OFDM symbols. More specifically, FIG. 2 depicts an encoder 51 for BCH coding with its input port connected to receive the PLPn BICM interface signal from the output port of the BBFRAME scrambler 29 and with its output port connected the input port of an encoder 52 for LDPC coding. FIG. 2 depicts the output port of the encoder 52 for LDPC coding connected to the input port of a bit interleaver 53, the output port of which is connected for applying bit-interleaved bit-wise FEC coding to the input port of a further interleaver 54 that shuffles the order of the QAM symbols in each successive FEC block. This shuffling implements cyclic delay diversity (CDD) that helps the FEC coding to overcome fading. The output port of the interleaver 54 connects to the write-input port of dual-port random-access memory 55. The dual-port RAM 55 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 54 and possibly the bit interleaver 53 as well may be subsumed into the dual-port RAM 55 by appropriately controlling the read addressing and write addressing thereof.

The two read-output ports of the dual-port RAM 55 connect separately to respective input ports of a conjugate pair 56 of mappers for mapping successive bits of the interleaved bit-wise FEC coding to successive QAM symbol constellations. Each of the pair 56 of conjugate mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLPn. A first of the pair 56 of conjugate mappers responds to the consecutive segments of the interleaved bit-wise FEC coding in initial transmissions thereof to generate the complex coordinates of successive QAM constellations. A second of the pair 56 of conjugate mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to fifth and sixth patterns, respectively. Bits that map to lattice points in the fifth mapping pattern more likely to experience error are mapped to lattice points in the sixth mapping pattern less likely to experience error. Bits that map to lattice points in the sixth mapping pattern more likely to experience error are mapped to lattice points in the fifth mapping pattern less likely to experience error. The complex coordinates of the QAM symbol constellations are supplied from the respective output ports of the conjugate pair of 56 of mappers to respective input ports of the assembler 30 for assembling a stream of OFDM symbols.

There is usually a number of other physical layer pipes besides PLP0, PLP1 and PLPn, which other physical pipes are identified by the prefix PLP followed by respective ones of consecutive numbers two through (n−1). Each of the PLPs, n in number, may differ from the others in at least one aspect. One possible difference between these n PLPs concerns the natures of the concatenated BCH-LDPC coding these PLPs respectively employ. ETSI standard EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

Each of the interleavers 34, 44, 54 etc. in the data PLPs can by way of specific example, be composed of a cell interleaver (as specified in §§6.4 of ETSI standard EN 302 755 V1.3.1) followed in cascade connection by a time interleaver (as specified in §§6.5 of ETSI standard EN 302 755 V1.3.1). ETSI standard EN 302 755 V1.3.1 defines the OFDM cell as being the modulation value for one OFDM carrier during one OFDM symbol—i.e., a single modulation constellation symbol. The pseudo-random cell interleaving spreads the cells uniformly in each FEC codeword to ensure an uncorrelated distribution of channel distortions and interference along the FEC codewords in the receiver. Furthermore, the cell interleaving "rotates" the interleaving sequence differently in each of the FEC blocks of one time interleaver (TI) block. If used, time interleaving operates at PLP level, and the parameters of the time interleaving may differ for different PLPs within the COFDM broadcasting system.

The function of the assembler 30 is to assemble the complex coordinates of QAM symbol constellations read from the pairs of mappers 36, 46, 56 etc. for each of the PLPs and the complex coordinates of QAM symbol constellations of the modulated L1 signaling data into arrays of OFDM symbols to be conveyed successively within respective ones of OFDM frames—e.g., T2-frames as prescribed for DVB-T2 in ETSI standard EN 302 755 V1.3.1. Successive ones of these T2-frames, possibly with Future Extension Frame (FEF) parts interspersed among them, make up super-frames in the overall frame structure. The assembler 30 comprises respective buffer memories for the n PLPs and means for time-division multiplexing OFDM frames from the various PLPs into an OFDM generation interface signal to be supplied to the FIG. 4 portion of the transmitter apparatus for broadcasting DTV signals. The buffer memories included in the assembler 30 are usually dual-ported random-access memories (RAMs). The time interleaving procedures described in §§6.5 of ETSI standard EN 302 755 V1.3.1 are subsumed into the addressing of these RAMs. Designs are possible in which the buffer memories for the assembler 30 are subsumed at least in part within the dual-port RAMs 35, 45, 55 etc. The operation of the assembler 30 for assembling a serial stream of OFDM symbols takes into account the conformation of the OFDM frame structure and is further controlled responsive to the dynamic scheduling information produced by the scheduler 10 depicted in FIG. 1. FIG. 2 does not explicitly show the connections for applying these control signals to the assembler 30. FIG. 2 shows the assembler 30 connected for receiving at an input port thereof coordinates of P2 modulation symbols supplied from apparatus depicted in FIG. 3.

The coordinates of P2 modulation symbol constellations supplied from the FIG. 3 apparatus convey the conformation of the OFDM frame structure and also convey the dynamic scheduling information (DSI) produced by the scheduler 10. FIG. 3 depicts a first-layer signal generator 20 with two input ports and two output ports. The first of the two input ports is connected for receiving DSI from the scheduler 10, and the second of the two input ports is connected for receiving digital indications specifying the conformation of the OFDM frame structure. Responsive to these control signals received at its first and second input ports, the first-layer (L1) signal generator 20 generates L1-pre signaling at its first output port and L1-post signaling at its second output port.

FIG. 3 depicts an encoder 57 for BCH coding having its input port connected for receiving L1-pre signaling supplied from the first output port of the first-layer (L1) signal generator 20. The output port of the encoder 57 for BCH coding connects to the input port of an encoder 58 for LDPC coding. The output port of the encoder 58 connects to the input port of a puncturer 59, the output port of which connects to the input port of a mapper 60 for mapping the coded L1-pre signaling to BPSK symbol constellations. The output port of the mapper 60 connects to a first of two input ports of a time-division multiplexer 61. Details of the processing of L1-pre signaling are essentially as described in §§7.3.1.1 of ETSI standard EN 302 755 V1.3.1 for DVB-T2.

FIG. 3 depicts a bit scrambler 62 having its input port connected for receiving L1-post signaling supplied from the second output port of the first-layer (L1) signal generator 20. The bit scrambler 62 provides data bit randomization similar to that provided by the BBFRAME scramblers 9, 19 and 29. The output port of the bit scrambler 62 connects to the input port of an encoder 63 for CRC-8 coding, the output port of which connects to the input port of an encoder 64 for BCH coding. The output port of the encoder 64 for BCH coding connects to the input port of an encoder 65 for LDPC coding. FIG. 3 shows the output port of the encoder 65 connected to the input port of a puncturer 66, the output port of which connects to the input port of a bit interleaver 67 similar to the bit interleavers 33, 43 and 54. The output port of the bit interleaver 67 connects to the input port of a mapper 68 for mapping the coded L1-post signaling to BPSK, QPSK, 16QAM or 64QAM symbol constellations. The output port of the mapper 68 connects to the second input port of the time-division multiplexer 61. The puncturer 66 is optional and can be replaced by a direct connection from the output port of the encoder 65 for LDPC coding to the input port of the bit interleaver 67. Details of the processing of L1-post signaling are essentially as described in §§7.3.2 and §§7.3.3 of ETSI standard EN 302 755 V1.3.1 for DVB-T2.

The time-division multiplexer 61 is configured for generating a response therefrom that time-interleaves complex coordinates of the BPSK symbol constellations mapping respective segments of coded L1-pre signaling supplied to its first input port from the mapper 60 with the complex coordinates of the BPSK, QPSK or QAM symbol constellations mapping respective segments of coded L1-post signaling supplied to its second input port from the mapper 68. FIG. 3 indicates that the time-division multiplexer 61 supplies the complex coordinates of P2 symbols in its response to a respective input port of the assembler 30 of OFDM symbols depicted in FIG. 2.

A transmission signal in an OFDM broadcast system is transmitted in successive segments called OFDM symbol blocks. Each OFDM symbol block includes an interval during which an effective symbol is supplied for inverse discrete Fourier transformation (I-DFT), and further includes a guard interval into which the waveform of a concluding portion of the latter half of this effective symbol will be directly copied. This guard interval is provided at the beginning of the initial half of the OFDM symbol block. In an OFDM system, such a guard interval is provided to improve performance during multi-path reception. A plurality of OFDM symbol blocks are collected to form one OFDM transmission frame, which DVB-T2 denominates a T2 frame.

FIG. 4 depicts apparatus that generates and transmits radio-frequency COFDM signals responsive to the stream of OFDM symbols supplied via an OFDM generation interface from the output port of the assembler 30 for assembling a serial stream of OFDM symbols, which assembler 30 is depicted in FIG. 2. The output port of the assembler 30 connects to the input port of a parser 69 for parsing the stream of complex coordinates of BPSK, QPSK and QAM symbol constellations into the effective portions of COFDM symbols. The output port of the parser 69 connects to the input port of a pilot carriers insertion and dummy tones reservation unit 70, the output port of which unit 70 connects to the input port of an OFDM modulator 71. E.g., the unit 70 inserts pilot carriers as described in §9.2 of ETSI standard EN 302 755 V1.3.1 for DVB-T2. The unit 70 may also insert zero-valued carriers to reserve spectrum for the subsequent insertion of dummy tones by a peak-to-average-power-ratio (PAPR) reduction unit 72.

The OFDM modulator 71 includes a serial-to-parallel converter for converting the serially generated complex digital samples of the effective OFDM symbols to parallel complex digital samples for inverse discrete Fourier transformation (I-DFT). The OFDM modulator 71 further includes a parallel-to-serial converter for converting the parallel complex digital samples of the I-DFT results to serial complex digital samples of the I-DFT results. The OFDM modulator 71 has 1K, 2K, 4K, 8K, 16K or 32K carriers capability. That is, DFT size can be 1K, 2K, 4K, 8K, 16K or 32K. Conventional practice is also to allow extensions of the 8K, 16K and 32K sizes of DFT. The 8K, 16K and 32K sizes of DFT are suitable for transmissions to stationary DTV receivers. Transmissions to mobile receivers are apt to employ smaller DFT size, 8K generally being preferred. The 1K DFT size is employed when sending indications of the beginnings of T2 frames. FIG. 4 shows a connection for applying digital samples supplied from the output port of the OFDM modulator 71 to the input port of a peak-to-average-power-ratio (PAPR) reduction unit 72.

ETSI standard EN 302 755 V1.3.1 includes two methods for reducing PAPR in DVB-T2 that allow about a 58% reduction in peak amplifier power rating, which can save electricity costs for a broadcasting station significantly. In the first method, called "tone reservation", 1% of the OFDM carriers are reserved and do not carry any data, but instead may be used for inserting values that will counteract the peaks in the signal. In the second method, called "active constellation extension", the values of certain of the edge constellation points are moved "outwards" in such way as to reduce the signal peaks. Since only edge constellation points are ever moved outwards, their movement has no significant impact on the ability of the DTV receiver to decode the data.

The output port of the PAPR reduction unit 72 is connected to the input port of a guard-interval-and-cyclic-prefix-insertion unit 73. The output port of the guard-interval-and-cyclic-prefix-insertion unit 73 is connected to the input port of a unit 74 for inserting preamble-1 (P1) symbols into the digital data stream. The output port of the P1 symbols insertion unit 74 connects to the input port of a digital-to-analog converter 75, the output port of which is connected for supplying analog COFDM carriers to a first input port of an amplitude modulator 76 for modulating the amplitude of its response to radio-frequency (RF) oscillations supplied to a second input port thereof from the output port of a radio-frequency oscillator 77. The output port of the amplitude modulator 76 is connected for supplying amplitude-modulated RF oscillations to the input port of a linear power amplifier 78. FIG. 4 shows the output port of the linear power amplifier 78 connected for driving RF analog COFDM signal power to a transmission antenna 79. FIG. 4 omits showing some details of the DTV transmitter, such as band-shaping filters for the RF signals.

FIG. 4 shows the amplitude modulator 76 connected for modulating a carrier wave of the radio-frequency of the ultimate transmissions from the transmission antenna 79. In actual commercial practice the amplitude modulator 76 is apt to be connected for modulating a carrier wave of intermediate frequency (IF). An up-converter converts the amplitude modulator 76 intermediate-frequency response to final radio frequencies and is connected for supplying them from its output port to the input port of the linear power amplifier 78. In some designs for the DTV transmitter the DAC 75 is designed to compensate for non-linear transfer functions of the amplitude modulator 76, of the up-converter if used, and of the linear power amplifier 78.

Figure 5:
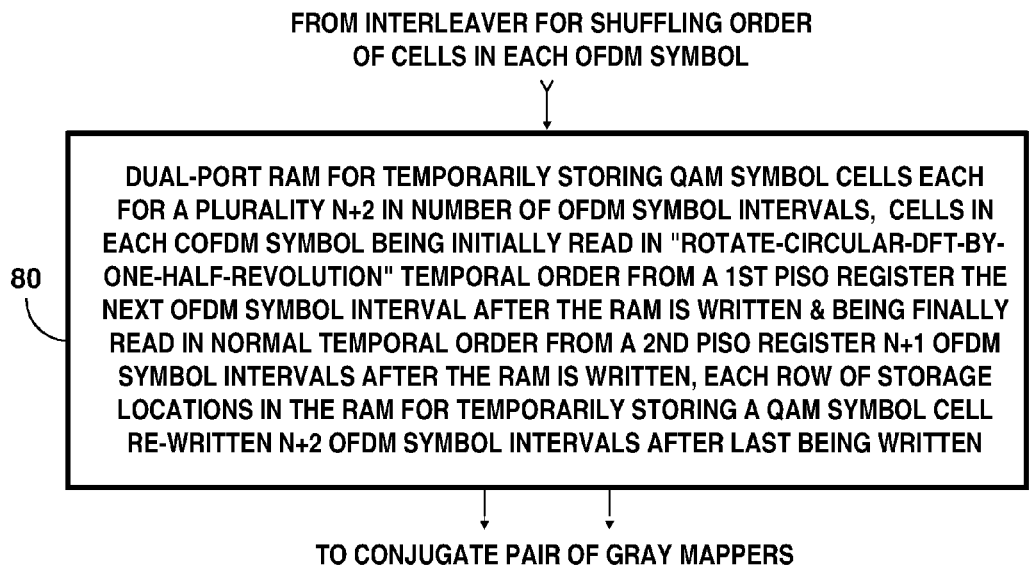
FIG. 5 provides greater detail as to the configuration of each of the dual-port random-access memories depicted in FIG. 2.

FIG. 5 provides greater detail as to possible structure and operation of each of the dual-port RAMs 35, 45, 55 etc. depicted in FIG. 2. FIG. 5 indicates any one of these RAMs to be capable of storing QAM symbol cells for plurality N+2 in number of COFDM symbol intervals and to be configured to be operable in the following way. The write addressing of the RAM 80 scrolls through N+2 rows of storage locations, each of which rows of of storage locations provides temporary storage for a respective OFDM symbol. Each successive OFDM symbol in a PLP is written in normal temporal order from one of the interleavers 34, 44, 54 etc. into the FIG. 5 RAM 80 via its write-input port and thereafter is immediately loaded in parallel into a first parallel-in/serial-out (PISO) register from its row of storage locations in the random-access memory. That first PISO register is then read to supply a first mapper in one of the pairs 36, 46, 56 etc. of mappers, with the final halves of OFDM symbols as written into RAM 80 in normal temporal order being read from a first serial output port of the dual-port RAM 80 before their respective initial halves. That is, the QAM symbol cells in each OFDM symbol are initially read out from the first serial output port of the RAM 80 in "rotate-circular-DFT-by-one-half-revolution" temporal order. N+1 coded-OFDM symbol intervals after the QAM symbol cells in each of the OFDM symbols are written, these QAM symbol cells are loaded in parallel into a second PISO register from the row of storage locations in the random-access memory for temporarily storing that OFDM symbol, just before that row of storage locations is re-written by a new COFDM symbol. That second PISO register is then read to supply a second mapper in one of the pairs 36, 46, 56 etc. of mappers with QAM symbol cells as written into RAM 80 in normal temporal order being read from a second serial output port of the RAM 80. That is, the QAM symbol cells in each OFDM symbol are finally read out from the second serial output port of the RAM 80, and this final read-out is in the same normal temporal order as the QAM symbol cells supplied to the RAM 80 for being written into respective rows of storage locations therein.

In some COFDM transmitter apparatuses one or more of the PLPs provides only single-time transmission of data. If such a PLP includes a RAM for temporarily storing QAM symbol cells, it need not be dual-ported. The RAM simply provides temporary storage to assist time-division multiplexing of COFDM symbols carried out by the assembler 30 of a serial stream of COFDM symbols.

The plurality N of COFDM symbol intervals of delay between the initial transmission of a rotated COFDM symbol and the final transmission of a corresponding non-rotated COFDM symbol is a design consideration that has been addressed only incidentally thusfar in this specification. The number N need not be the same for each PLP.

As a first alternative, the plurality N can be large, a multiple of the number of COFDM symbols in a time slice of the PLP response, in order to accommodate the design of receivers able to overcome drop-outs in received signal strength that last up to a second or more. Receivers used in moving vehicles are apt to experience such protracted drop-outs in received signal strength. Each unit increase in the multiple of the number of COFDM symbols in a time slice of the PLP increases the delay between initial and final transmissions of related COFDM symbols by a T2 frame interval that can be up to 250 milliseconds in duration. This presumes that the PLP is a type 1 PLP. When final transmissions are delayed for a prescribed number of T2 frame intervals respective to initial transmission of the same data, the delay is subject to variation. This is because T2 frames can vary in size. Furthermore, future extension frames (FEFs) of indeterminate size may be interspersed among T2 frames. Also, if the PLP is a type 2 PLP, sub-slices of the PLP are apt to be unevenly spaced in time.

Arranging for a T2 frame of an initial transmission of data to be immediately followed by a T2 frame of a final transmission of corresponding data avoids having to signal the DTV receiver specifically as to the delay between the two transmissions. The preamble of each T2 frame can signal whether that T2 frame conveys an initial or a final transmission of data. This arrangement probably best accommodates receivers designed to receive only the final transmissions of data.

Also, when the delay between initial and final transmissions of related COFDM symbols is increased to a number of T2 frame intervals extending over a second or more, the receiver is apt to experience less correlation between deep frequency-selective fading of the COFDM symbols in the final transmissions and deep frequency-selective fading of the rotated COFDM symbols in the initial transmissions. So, code-combining final transmissions with initial transmissions delayed to concur with corresponding final transmissions, which code-combining is done either before or after unmapping of QPSK or QAM symbols, will be less likely able to suppress the effects of frequency-selective fading. This is the reason that interleavers 35, 45, 55 etc. for shuffling the order of QPSK or QAM symbols within COFDM symbols are included in the FIG. 2 portions of DTV transmitters. De-shuffling the QPSK or QAM symbols within COFDM symbols received by a DTV receiver disperses the effects of the frequency-selective fading, so that decoding of the concatenated BCH coding and LDPC coding is more likely to succeed in faithfully reproducing data that was transmitted.

As a second alternative, the odd number N of COFDM symbol intervals between initial and final transmissions of related COFDM symbols can be very small—e.g., nine or less, even only a single COFDM interval. This makes it much more likely that the receiver will experience strong correlation between deep frequency-selective fading of the COFDM symbols in the final transmissions and deep frequency-selective fading of the rotated COFDM symbols in the initial transmissions. Accordingly, code-combining final transmissions with initial transmissions delayed to concur with corresponding final transmissions, which code-combining is done either before or after unmapping of QAM symbols, will be quite likely able to suppress the effects of frequency-selective fading. This is of particular benefit to stationary DTV receivers receiving transmissions from two or more transmitters in a single-frequency network (SFN). De-shuffling QAM symbols within COFDM symbols received by a DTV receiver disperses the effects of the frequency-selective fading, so that decoding of the concatenated BCH coding and LDPC coding is more likely to succeed in faithfully reproducing data that were transmitted.

If DTV transmitters are permitted to make initial and final transmissions of the same data in more than one way, a DTV transmitter has to signal DTV receivers which way or ways it makes initial and final transmissions of the same data. This signaling can be done utilizing the L1-post signaling extension fields provided for in the DVB-T2 standard. However, signaling can also be done by modifying indications in the fields in L1-pre signaling or L1-post signaling, which fields are already specified in the DVB-T2 standard. Preferably, the modifications are such that initial and final transmissions of the same data can be made differently in individual PLPs with the same T2 frames. This affords a broadcaster flexibility in tailoring some PLPs for services designed particularly for reception by stationary DTV receivers and other PLPS for services designed particularly for reception by DTV receivers in moving vehicles. The beginning of each T2 frame begins with a P1 symbol applicable to the entire T2 slice. This P1 symbol is followed by a number of P2 symbols, one for each PLP in the T2 frame, facilitating specifying the delay between initial and final transmissions of the same data individually for each data PLP having a time slice in the T2 frame.

The single-bit PLP_ROTATION field in the respective configurable L1-post signaling portion of each P2 symbol can be modified to indicate by ZERO that a PLP does not convey both initial and final transmissions of the same data and to indicate by ONE that the PLP does convey both those initial and final transmissions. If the modified single-bit PLP_ROTATION field is ZERO, this signals receivers that a single-time transmission is being made of data that will not be repeated. If the modified single-bit PLP_ROTATION field is ONE to signal that the PLP conveys both those initial and final transmissions of the same data, the receiver then needs to know how many COFDM symbol intervals are in the delay between initial and final transmissions of the same data.

The 3-bit PLP_TYPE field in L1-post signaling per DVB-T2 can be modified to allow any one of four additional indications. A first of the four additional indications, such as 110, identifies a type 1 data PLP that conveys both initial transmissions of data in rotated temporal order and final transmissions of the same data in normal temporal order after a delay of fewer COFDM symbol intervals than in a slice of the PLP response within a T2 frame. A second of the four additional indications in the PLP_TYPE field, such as 100, identifies a type 1 data PLP that conveys both initial transmissions of data in rotated temporal order and final transmissions of the same data in normal temporal order after a delay of more COFDM symbol intervals than in a slice of the PLP response within a T2 frame. These first and second additional indications both contrast with the 001 indication of a type 1 data PLP, which 001 indication is thenceforth interpreted as a confirmation that the type 1 data PLP conveys single-time transmission of data that is not repeated.

A third of the four additional indications in the PLP_TYPE field, such as 101, identifies a type 2 data PLP that conveys both initial transmissions of data in rotated temporal order and final transmissions of the same data in normal temporal order after a delay of fewer COFDM symbol intervals than in a sub-slice of the PLP response within a T2 frame. A fourth of the four additional indications, such as 111, identifies a type 2 data PLP that conveys both initial transmissions of data in rotated temporal order and final transmissions of the same data in normal temporal order after a delay of more COFDM symbol intervals than in a sub-slice of the PLP response within a T2 frame. These first and second additional indications both contrast with the 010 indication of a type 2 data PLP, which 010 indication is thenceforth interpreted as a confirmation that the type 2 data PLP conveys single-time transmission of data that is not repeated.

If either of the first and third additional indications is transmitted in the PLP_TYPE field, the number of full COFDM symbol intervals delay between the initial and final transmissions of the same data is specified in the 11-bit RESERVED_1 field in configurable L1-post signaling. DTV receivers are designed to respond to either of the first and third additional indications being received in the PLP_TYPE field as a key for interpreting the indications received specified in that RESERVED_1 field as specifying the number of full COFDM symbol intervals delay between the initial and final transmissions of the same data.

If the second additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the second additional indication being received in the PLP_TYPE field as a key for interpreting the indications received specified in that RESERVED_1 field as specifying the number of full T2 slice intervals delay between the initial and final transmissions of the same data.

If the fourth additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the fourth additional indication being received in the PLP_TYPE field as a key for interpreting the indications received specified in that RESERVED_1 field as specifying the number of partial T2 slice intervals delay between the initial and final transmissions of the same data. DTV receivers must further decide what the proper phasing is of final transmissions of data respective to initial transmissions conveying the same data. A DTV receiver can assign alternate COFDM symbols as belonging to respective ones of initial and final transmissions of the same data by counting COFDM symbols from the start of a PLP slice or sub-slice, signaling of such starts being included in the L1-post signaling specified in the DVB-T2 standard. A DTV receiver can further include apparatus to detect substantial correlation between initial and final transmissions of the same data within a PLP, thereby to confirm correctness of an assignment of alternate COFDM symbols to respective ones of those initial and final transmissions of the same data.

Figure 6:
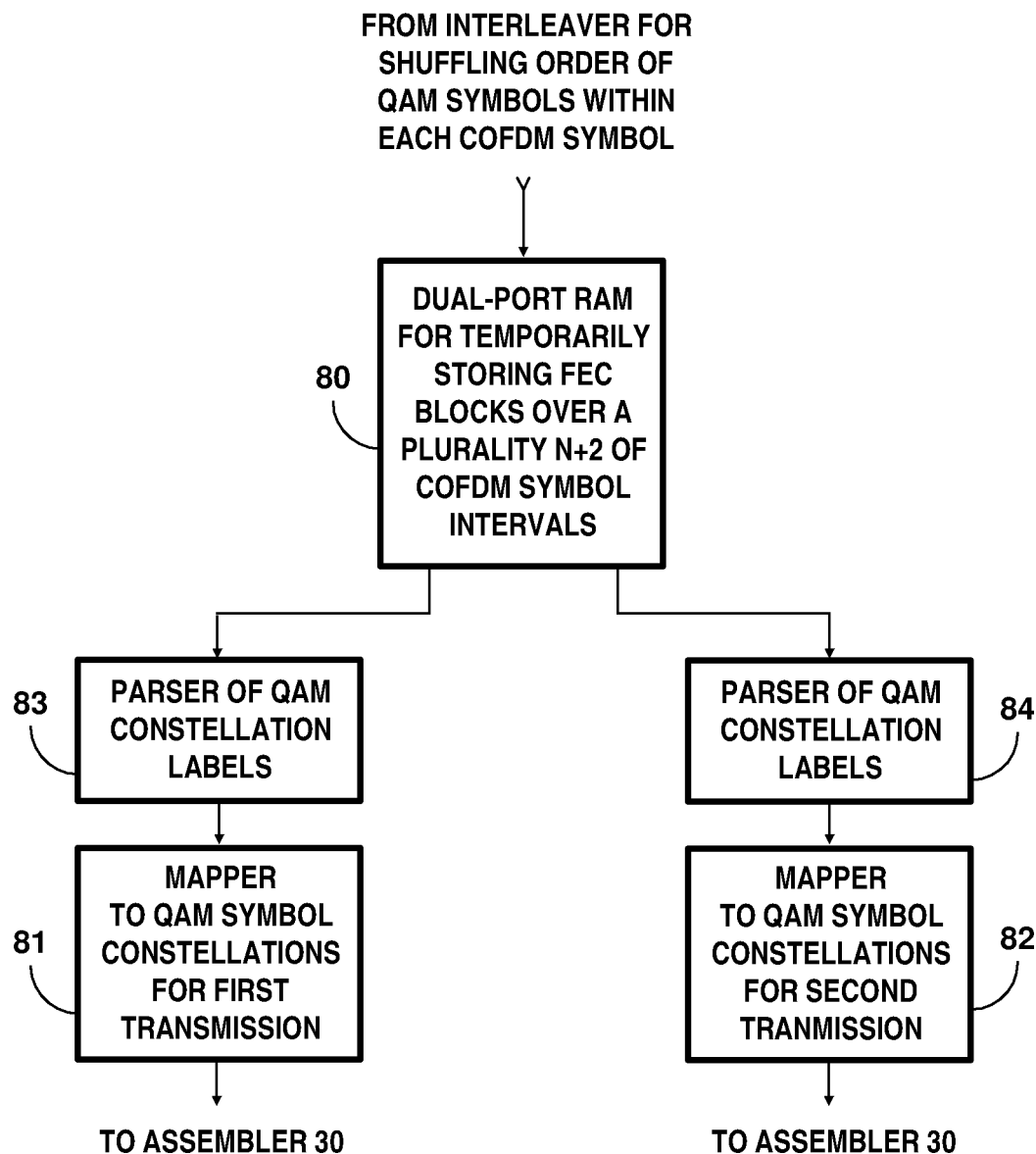
FIG. 6 is a detailed schematic diagram of connections of the two read-output ports of the dual-port random-access memory depicted in FIG. 5 to a pair of mappers to QAM symbols.

FIG. 6 illustrates how the two read-output ports of the dual-port random-access memory 80 depicted in FIG. 5 are connected respectively to a first QAM symbol mapper 81 and to a second QAM symbol mapper 82. The QAM symbol cells of each successive COFDM symbol initially read from the first serial output port of the RAM 80 in "rotate-circular-DFT-by-one-half-revolution" temporal order are supplied to the input port of a parser 83 of QAM constellation labels. The output port of the parser 83 is connected for supplying QAM constellation labels as input signal to the input port of the QAM symbol mapper 81. The QAM symbol cells of each successive COFDM symbol finally read from the second serial output port of the RAM 80 in the same temporal order as written are supplied to the input port of a parser 84 of QAM constellation labels. The output port of the parser 84 is connected for supplying QAM constellation labels as input signal to the input port of the QAM symbol mapper 82. The parsers 83 and 84 supply 4-bit QAM constellation labels as input signals to the mappers 81 and 82 if those mappers map to 16QAM symbol constellations. The parsers 83 and 84 supply 6-bit QAM constellation labels as input signals to the conjugate mappers 81 and 82 if those mappers map to 64QAM symbol constellations, and so forth.

Figure 7:
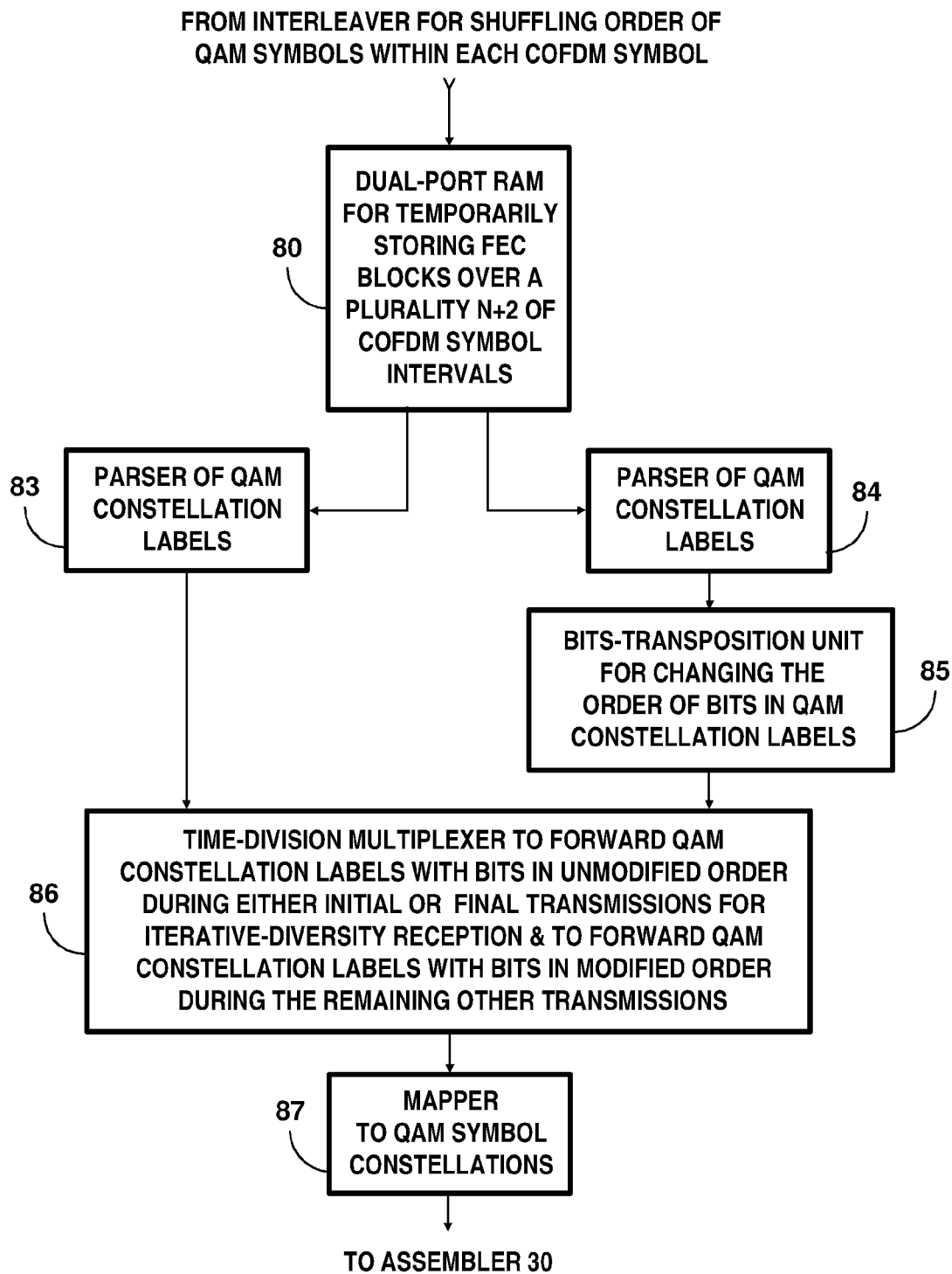
FIG. 7 is a detailed schematic diagram of connections of the two read-output ports of the dual-port random-access memory depicted in FIG. 5 to a single mapper to QAM symbols, which connections facilitate different mapping patterns at staggered times.

FIG. 7 illustrates how the two read-output ports of the dual-port random-access memory 80 depicted in FIG. 5 are connected just to a single mapper 87 to QAM symbols, which connections allow the single mapper 82 to operate with two different mapping patterns at staggered times. The QAM symbol cells of each successive COFDM symbol initially read from the first serial output port of the RAM 80 in "rotate-circular-DFT-by-one-half-revolution" temporal order are supplied to the input port of the parser 83 of QAM constellation labels. The QAM symbol cells of each successive COFDM symbol finally read from the second serial output port of the RAM 80 in the same temporal order as written are supplied to the input port of the parser 84 of QAM constellation labels. The output port of the parser 83 is connected for supplying QAM constellation labels as input signal to the input port of a bits-transposition unit 87 for changing the order of the bits in each of those QAM constellation labels to generate modified QAM constellation labels supplied from its output port as input signal to the first of two input ports of a time-division multiplexer 88. The output port of the parser 84 is connected for supplying QAM constellation labels as input signal to the second input port of the time-division multiplexer 88. The output port of the time-division multiplexer 88 is connected for supplying QAM constellation labels to the input port of the single mapper 87 to QAM symbols.

Mathematicians consider QAM symbol constellations to be "point lattices" in two-dimensional space, with the various points in each lattice being identified by a respective plural-bit label. FIG. 8 illustrates a specific first way in which the FIG. 2 portion of the COFDM transmitter apparatus Gray maps 4-bit segments of interleaved FEC coding to the lattice points of 16QAM symbol constellations during sole transmissions and during final transmissions for iterative-diversity reception. FIG. 9 illustrates a specific second way in which the FIG. 2 portion of the COFDM transmitter apparatus Gray maps 4-bit segments of interleaved FEC coding to the lattice points of 16QAM symbol constellations during initial transmissions for iterative-diversity reception. More specifically, during initial transmissions for iterative-diversity reception the mapper 81 depicted in FIG. 6 can Gray map 4-bit segments of interleaved FEC coding to the lattice points of 16QAM symbol constellations as shown in FIG. 9. During sole transmissions and during final transmissions for iterative-diversity reception the mapper 82 depicted in FIG. 6 can Gray map 4-bit segments of interleaved FEC coding to the lattice points of 16QAM symbol constellations as shown in FIG. 8.

FIG. 10 illustrates a specific first way in which the FIG. 2 portion of the COFDM transmitter apparatus Gray maps 6-bit segments of interleaved FEC coding to the lattice points of 64QAM symbol constellations during initial transmissions for iterative-diversity reception. FIG. 11 illustrates a specific second way in which the FIG. 2 portion of the COFDM transmitter apparatus Gray maps 6-bit segments of interleaved FEC coding to the lattice points of 64QAM symbol constellations during final transmissions for iterative-diversity reception. More specifically, during initial transmissions for iterative-diversity reception the mapper 81 depicted in FIG. 6 can Gray map 6-bit segments of interleaved FEC coding to the lattice points of 64QAM symbol constellations as shown in FIG. 11. During final transmissions for iterative-diversity reception the Gray mapper 82 depicted in FIG. 6 can Gray map 6-bit segments of interleaved FEC coding to the lattice points of 64QAM symbol constellations as shown in FIG. 10.

FIGS. 12(a), 12(b), 12(c) and 12(d) depict respective quadrants of a FIG. 12 first Gray map of 256QAM symbol constellations. FIG. 12 illustrates a specific first way in which the FIG. 2 portion of the COFDM transmitter apparatus Gray maps 8-bit segments of interleaved FEC coding to the lattice points of 256QAM symbol constellations during sole transmissions and during final transmissions for iterative-diversity reception. FIGS. 13(a), 13(b), 13(c) and 13(d) depict respective quadrants of a FIG. 13 second Gray map of 256QAM symbol constellations. FIG. 13 illustrates a specific second way in which the FIG. 2 portion of the COFDM transmitter apparatus Gray maps 8-bit segments of interleaved FEC coding to the lattice points of 256QAM symbol constellations during initial transmissions for iterative-diversity reception.

Figure 14:
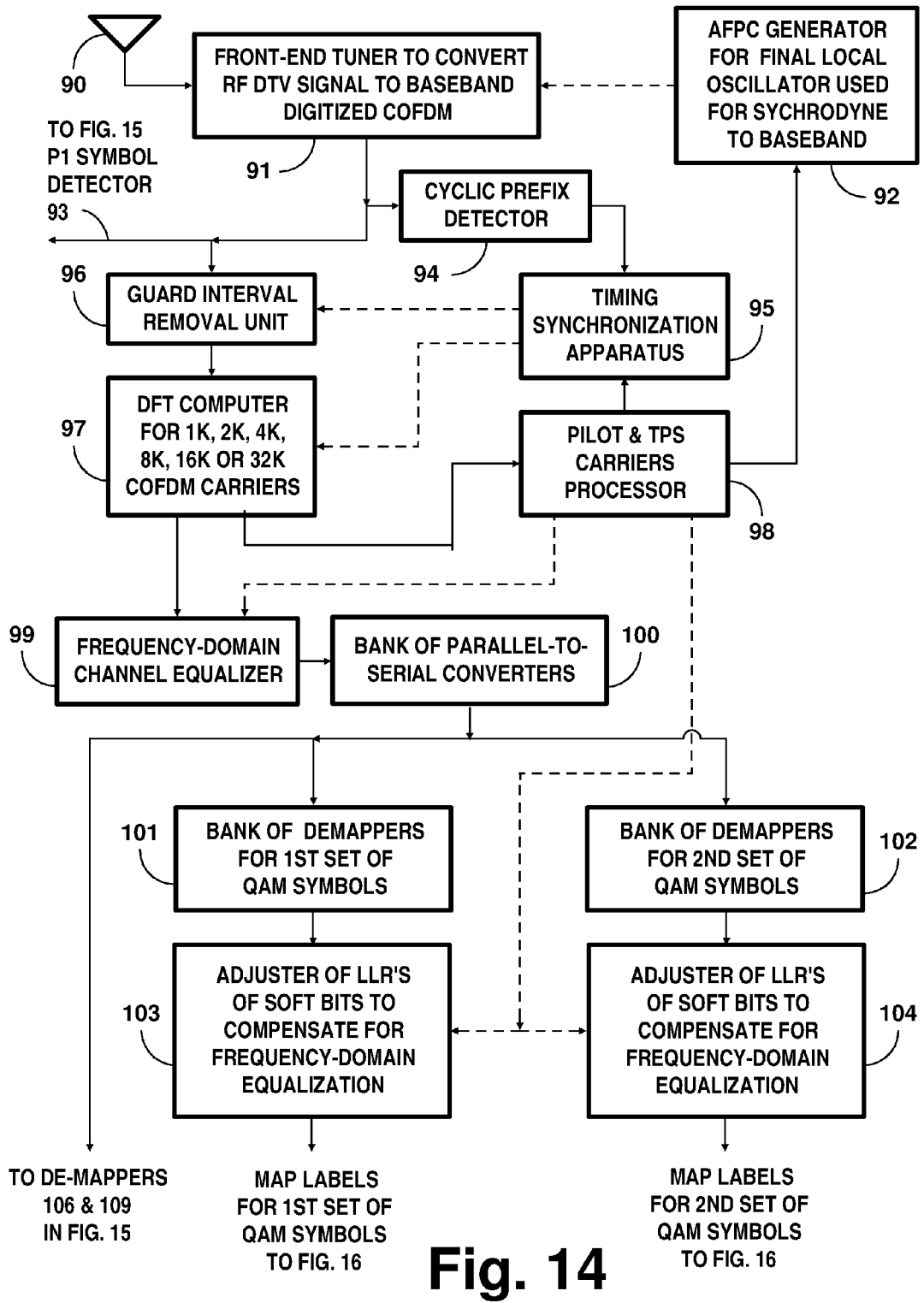
FIGS. 14, 15, 16 and 17 together form a schematic diagram of COFDM receiver apparatus configured for iterative-diversity reception of COFDM signals, which COFDM receiver apparatus includes in accordance with the invention a maximal-ratio combiner operative on soft bits at bit level, rather than at symbol level, to combine the results of dual QAM demappers for the iterative-diversity COFDM signals.

FIG. 14 shows the initial portion of a DTV receiver designed for iterative-diversity reception of COFDM signals as transmitted at VHF or UHF by a DTV transmitter, such as the one depicted in FIGS. 1, 2, 3 and 4. A reception antenna 90 captures the radio-frequency COFDM signal for application as input signal to a front-end tuner 91 of the receiver. The front-end tuner 91 can be of a double-conversion type composed of initial single-conversion super-heterodyne receiver circuitry for converting radio-frequency (RF) COFDM signal to intermediate-frequency (IF)

COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 91 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal accompanying the baseband COFDM signal. In some designs of the front-end tuner 91, synchronous demodulation is performed in the analog regime before subsequent analog-to-digital conversion of the resulting complex baseband COFDM signal. In other designs of the front-end tuner 91, analog-to-digital conversion is performed before synchronous demodulation is performed in the digital regime.

Simply stated, the front-end tuner 91 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples. FIG. 14 shows an AFPC generator 92 for generating the automatic frequency and phase control (AFPC) signal for controlling the final local oscillator within the front-end tuner 91.

Figure 17:
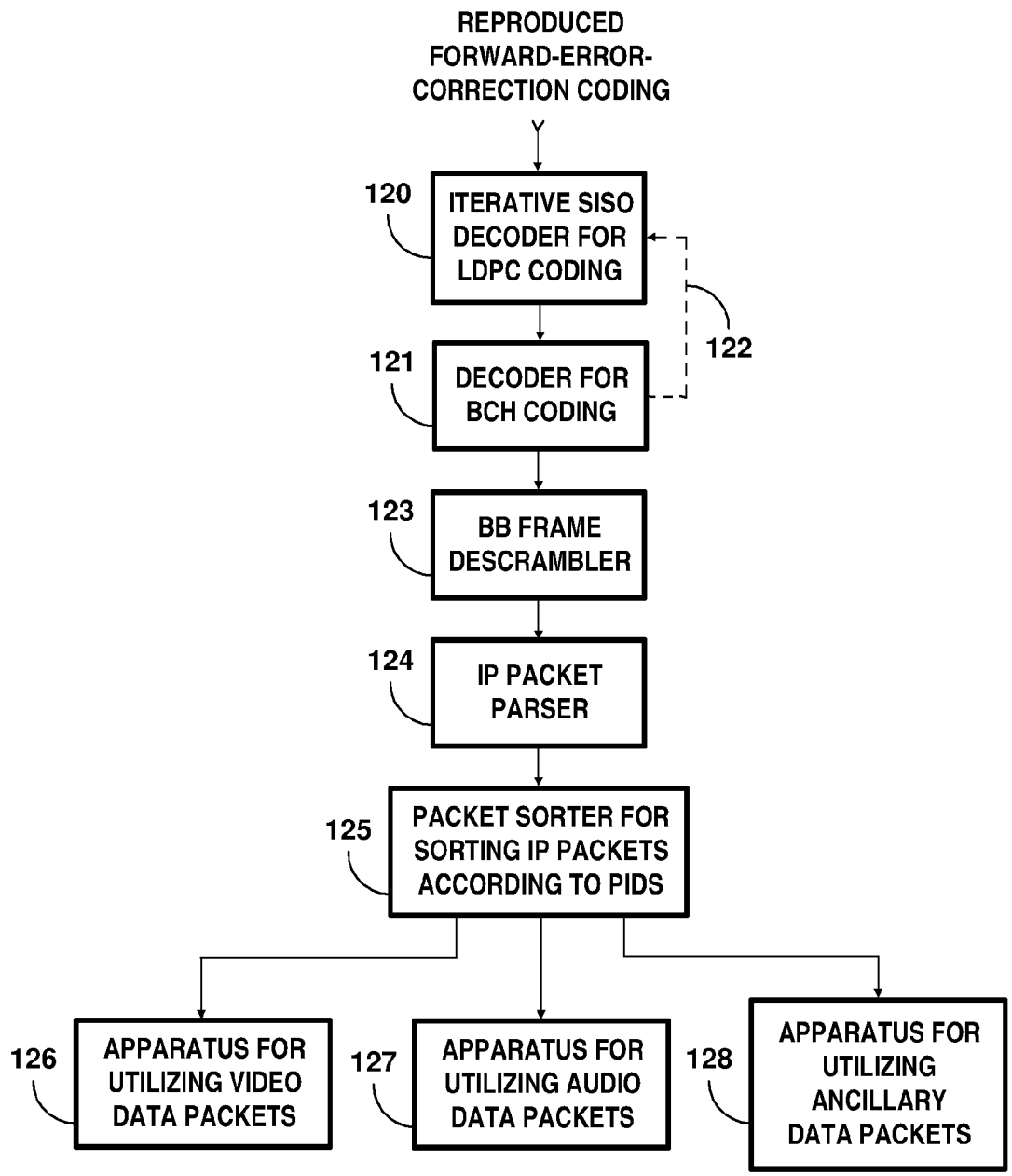
Figure 18:
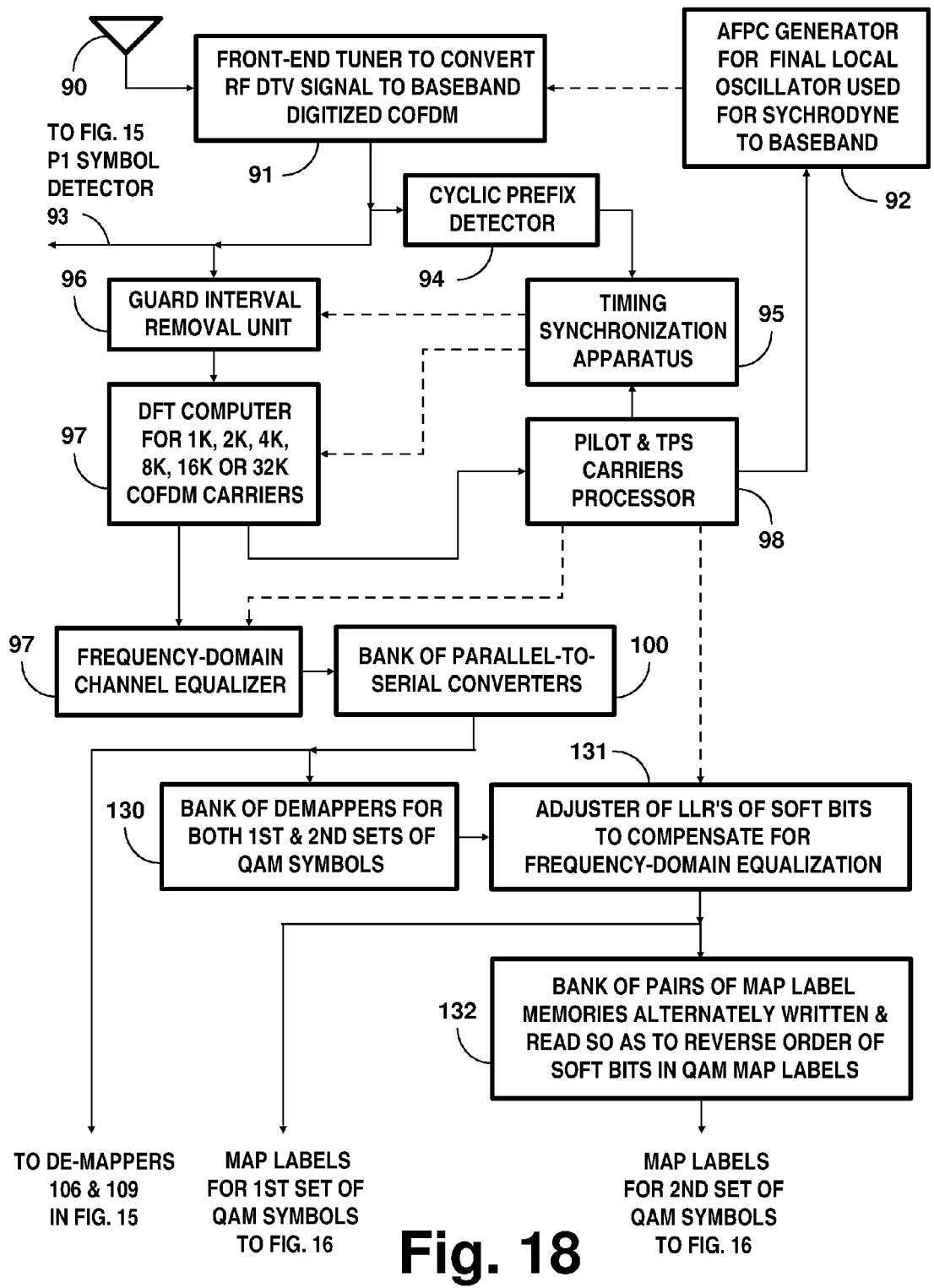
FIG. 18 is a schematic diagram of a modification of the FIG. 14 portion of the COFDM receiver apparatus depicted in FIGS. 14, 15, 16 and 17.

The output port of the front-end tuner 91 is connected for supplying digitized samples of baseband COFDM signal to the respective input ports of a P1 symbol detector 93 depicted in FIG. 18 and a cyclic prefix detector 94 depicted in FIG. 17. The cyclic prefix detector 94 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 94 is connected to supply these indications to a first of two input ports of timing synchronization apparatus 95.

A first of two output ports of the timing synchronization apparatus 95 is connected for supplying gating control signal to the control input port of a guard-interval-removal unit 96, the signal input port of which is connected for receiving digitized samples of baseband COFDM signal from the output port of the front-end tuner 91. The output port of the guard-interval-removal unit 96 is connected for supplying the input port of discrete-Fourier-transform computer 97 with windowed portions of the baseband COFDM signal that contain effective COFDM samples. A second of the output ports of the timing synchronization apparatus 95 is connected for supplying the DFT computer 97 with synchronizing information concerning the effective COFDM samples.

The indications concerning the phasing of COFDM symbols that the cyclic prefix detector 94 supplies to the timing synchronization apparatus 95 is sufficiently accurate for initial windowing of a baseband COFDM signal that the guard-interval-removal unit 96 supplies to the DFT computer 97. A first output port of the DFT computer 97 is connected for supplying demodulation results for at least all of the pilot carriers in parallel to the input port of a pilot carriers processor 98, and a second output port of the DFT computer 97 is connected for supplying demodulation results for each of the COFDM carriers to the input port of a frequency-domain channel equalizer 99. The processor 98 selects the demodulation results concerning pilot carriers for processing, part of which processing generates weighting coefficients for channel equalization filtering in the frequency domain. A first of three output ports of the processor 98 that are explicitly shown in FIG. 14 is connected for supplying these weighting coefficients (via wiring depicted as a dashed-line connection) to the frequency-domain channel equalizer 99, which uses those weighting coefficients for adjusting its responses to the demodulation results for each of the COFDM carriers.

A second of the output ports of the pilot carriers processor 98 that are explicitly shown in FIG. 14 is connected for supplying more accurate window-positioning information to the second input port of the timing synchronization apparatus 95. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 98 explicitly shown in FIG. 14 is connected for forwarding unmodulated pilot carriers to the input port of the AFPC generator 92. The real components of the unmodulated pilot carriers are multiplied by their respective imaginary components in the AFPC generator 92. The resulting products are summed and low-pass filtered to develop the AFPC signal that the AFPC generator 92 supplies to the front-end tuner 91 for controlling the final local oscillator therein. Other methods to develop AFPC signals for the final local oscillator in the front-end tuner 91 are also known, which can replace or supplement the method described above.

The DFT computer 97 is customarily constructed so it can demodulate any one of the 1K, 2K, 4k, 8K, 16K and 32K options as to the number of OFDM carriers. If this be the case, the correct option is chosen responsive to information from the P1 symbol detector 93 depicted in FIG. 15. As noted supra, the second output port of the DFT computer 97 is connected to supply demodulated complex digital samples of the complex coordinates of QPSK or QAM symbol constellations in parallel to the input port of the frequency-domain channel equalizer 99. To implement a simple form of frequency-domain channel equalization, the pilot carriers processor 98 measures the amplitudes of the demodulated pilot carriers to determine basic weighting coefficients for various portions of the frequency spectrum. The pilot carriers processor 98 then interpolates among the basic weighting coefficients to generate respective weighting coefficients supplied to the frequency-domain channel equalizer 99 with which to multiply the complex coordinates of QPSK or QAM symbol constellations supplied from the DFT computer 97. Various alternative types of frequency-domain channel equalizer are also known.

The DFT computer 97 is customarily constructed so it can demodulate any one of the 1K, 2K, 4k, 8K, 16K and 32K options as to the number of OFDM carriers. If this be the case, the correct option is chosen responsive to information from the P1 symbol detector 93 depicted in FIG. 15. As noted supra, the second output port of the DFT computer 97 is connected to supply demodulated complex digital samples of the complex coordinates of QPSK or QAM symbol constellations in parallel to the input port of the frequency-domain channel equalizer 99. To implement a simple form of frequency-domain channel equalization, the pilot carriers processor 98 measures the amplitudes of the demodulated pilot carriers to determine basic weighting coefficients for various portions of the frequency spectrum. The pilot carriers processor 98 then interpolates among the basic weighting coefficients to generate respective weighting coefficients supplied to the frequency-domain channel equalizer 99 with which to multiply the complex coordinates of QPSK or QAM symbol constellations supplied from the DFT computer 97. Various alternative types of frequency-domain channel equalizer are also known.

Figure 15:
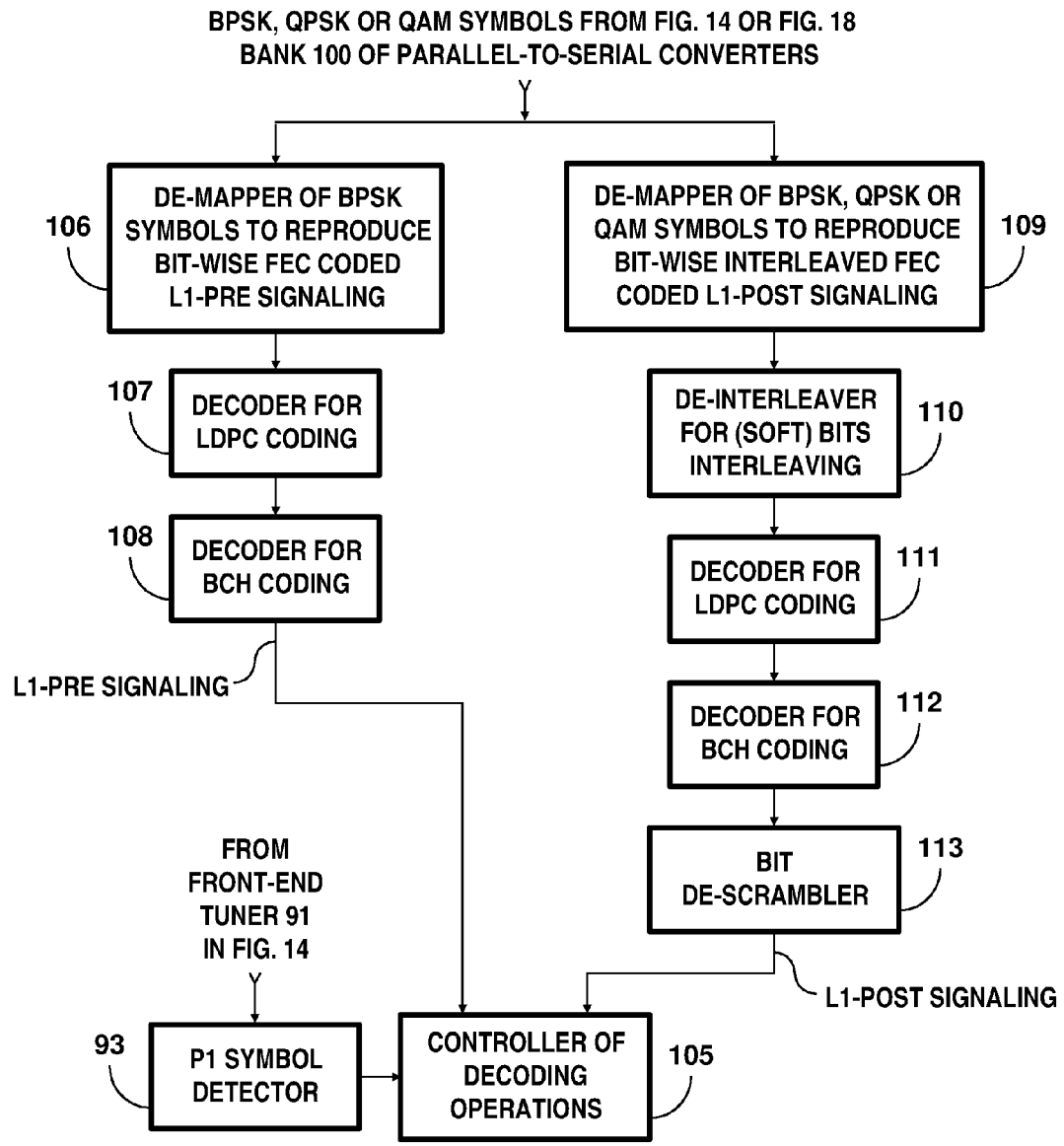

The output port of the DFT computer 97 involves a plurality of connections for supplying respective sets of complex coordinates for QPSK or QAM symbol constellations of respective OFDM carriers. The frequency-domain channel equalizer 99 weights each of these respective sets of complex coordinates for QPSK or QAM symbol constellations of respective OFDM carriers received in parallel at its input port and supplies the weighted responses in parallel from its output port to the respective input ports of a bank 100 of parallel-to-series converters. The response of the one of the parallel-to-series converters in this bank 100 of them that is appropriate for the number of OFDM carriers in the DFT and the sort of modulation symbol constellations for those carriers is selected as the response supplied from the bank 100 of parallel-to-series converters for unmapping of the modulation symbol constellations in that response. FIGS. 14 and 15 indicate that the response of the bank 100 of parallel-to-series converters is supplied directly to a demapper 106 of FEC-coded L1-pre signaling and to a demapper 109 of FEC-coded L1-post signaling, which demappers are depicted in FIG. 15.

The output port of the bank 100 of parallel-to-series converters is connected for supplying for serially supplying successive complex QAM symbol map coordinates to the input port of a bank 101 of demappers for a first set of QAM symbols conveyed by single-time transmissions that are not repeated or by the final transmissions for iterative-diversity reception. As thus far described, the FIG. 14 initial portion of a COFDM receiver is similar to the initial portions of COFDM receivers used for DVB-T2 in Europe. The output port of the bank 100 of parallel-to-series converters is further connected for supplying for serially supplying successive complex QAM symbol map coordinates to the input port of a bank 102 of demappers for a second set of QAM symbols conveyed by the initial transmissions for iterative-diversity reception.

FIG. 14 shows the output port of the bank 101 of demappers for a first set of QAM symbols connected to the input port of an adjuster 103 of the logarithmic likelihood ratios (LLRs) of the soft bits supplied from the bank 101 of demappers. FIG. 14 also shows the output port of the bank 102 of demappers for a second set of QAM symbols connected to the input port of an adjuster 104 of the logarithmic likelihood ratios (LLRs) of the soft bits supplied from the bank 102 of demappers. A fourth of the output ports of the pilot carriers processor 98 explicitly shown in FIG. 14 is connected to respective control input ports of the adjusters 103 and 104 of soft-bit LLRs with information concerning the frequency spectrum of each successive COFDM symbol. The functions of the adjusters 103 and 104 of soft-bit LLRs in response to this information will be explained further on in this specification. The output ports of the adjusters 103 and 104 of soft-bit LLRs supply modified map labels for the first set of QAM symbols and for the second set of QAM symbols, respectively, to diversity combining apparatus depicted in FIG. 16.

The output port of the bank 101 of demappers is connected for supplying Gray map labels for a first set of QAM symbols from one of its component demappers, as selected responsive to control signal supplied from a controller 105 of decoding operations in the DTV receiver, which controller 105 is depicted in FIG. 15. The output port of the bank 102 of demappers is connected for supplying Gray map labels for a second set of QAM symbols from one of its component demappers, as selected responsive to control signal supplied from a controller 105 of decoding operations in the DTV receiver. In effect, the controller 105 supplies the banks 101 and 104 of demappers instructions as to the size of Gray-mapped QAM symbol constellations in the COFDM signal currently being received. These two streams of Gray map labels that the banks 101 and 102 of demappers respectively supply are modified by the adjusters 103 and 104 of soft-bit LLRs, then are subsequently maximal-ratio combined at bit level in the FIG. 16 portion of the DTV receiver.

FIG. 15 depicts the controller 105 of decoding operations in the DTV receiver, but does not explicitly show the connections to elements of the receiver through which those elements are controlled. FIG. 15 shows the output port of the P1 symbol detector 93 connected to a respective input port of the controller 105. FIG. 15 further indicates that the input port of the P1 symbol detector 93 is connected for receiving baseband digitized COFDM signal from the front-end tuner 91 depicted in FIG. 14. The P1 symbol detector 93 detects each occurrence of a P1 symbol, which is based on a 1K OFDM symbol with frequency-shifted repeats at its beginning and its conclusion. A P1 symbol signals the beginning of a T2 frame, and the P1 symbol detector 93 supplies this important timing information to the controller 105. The structure of the P1 symbol facilitates easy detection thereof, as well as forestalling any possibility of its being imitated by any part of the signal within the ensuing T2 frame. Only a fraction of the 1K OFDM carrier positions convey energy, and these carry one of a set of carefully chosen data patterns to provide some capability for signaling the controller 105 for decoding operations in the DTV receiver. This format of P1 symbol provides (a) a simple and robust mechanism for rapid detection of T2 signals when a receiver scans through the appropriate spectrum band, (b) a fast frequency lock mechanism for the receiver and (c) 6-bits of signaling. E.g., these bits may be used for signaling the FFT size used for symbols in the T2 frame. If the DTV standard prescribes inverting the polarity of T2 frames of OFDM signals during initial transmissions, one of these bits can be reserved to signal such inversion.

FIG. 15 depicts a demapper 106 for successive coordinates of BPSK symbol constellations as supplied to its input port from the output port of the bank 100 of parallel-to-serial converters in FIG. 14. The controller 105 of decoding operations activates the demapper 106 when L1-pre signaling is received, the time for such activation being determined so as to follow the P1 symbol detector 93 indicating to the controller 105 that P1 symbols have just been detected in full. Responsive to the respective parities of the COFDM carriers, the demapper 106 generates "soft" bits in logarithmic-likelihood ratio (LLR) format that convey bit-wise FEC coded L1-pre signaling. These soft bits are supplied from the output port of the demapper 106 to the input port of a decoder 107 for LDPC coding. The output port of the decoder 107 for LDPC coding is connected for supplying reproduced BCH coding to the input port of a decoder 108 for BCH coding, the output port of which is connected for supplying reproduced L1-pre signaling to a respective input port of the controller 105 of decoding operations within the DTV receiver.

FIG. 15 depicts a demapper 109 for successive complex coordinates of QPSK or QAM symbol constellations as supplied to its input port from the output port of the bank 100 of parallel-to-serial converters in FIG. 19. ETSI standard EN 702 755 V1.3.1 prescribes BPSK, QPSK, 16QAM, or 64QAM symbol constellations be used for L1-post signaling in DVB-T2. The controller 105 of decoding operations activates an appropriate section of the demapper 109 when L1-post signaling is received, the time for such activation being determined so as to follow the P1 symbol detector 93 indicating to the controller 105 that P1 symbols have just been detected and further to follow the ensuing L1-pre signaling interval. The demapper 109 responds to the complex coordinates descriptive of successive BPSK symbol constellations to recover a single soft bit of FEC coding from each constellation. The demapper 109 responds to the complex coordinates descriptive of successive QPSK symbol constellations to recover two soft bits of FEC coding from each constellation. The demapper 109 responds to the complex coordinates descriptive of successive 16QAM symbol constellations to recover four soft bits of FEC coding from each constellation. The demapper 109 responds to the complex coordinates descriptive of successive 64QAM symbol constellations to recover six soft bits of FEC coding from each constellation. In any one of these four cases, the demapper 109 generates the soft bits of FEC coding in LLR format. The demapper 109 is connected to supply these soft bits from its output port to the input port of a de-interleaver 110 of the interleaving of those soft bits, attributable to the bit interleaver 68 in the FIG. 3 portion of the DTV transmitter. The design of the de-interleaver 110 is different for different ones of these four cases. The output port of the de-interleaver 110 connects to the input port of a soft-input/soft-output decoder 111 for decoding LDPC coding. The output port of the SISO decoder 111 is connected for supplying soft bits of BCH coding to the input port of a soft-input decoder 112 for decoding BCH coding.

FIG. 15 shows the output port of the BCH decoder 112 connected to the input port of a bits de-scrambler 113. The output port of the bits de-scrambler 113 is connected for supplying L1-post signaling to a respective input port of the controller 105 of decoding operations within the DTV receiver. The L1-post signaling has CRC-8 coding, which coding can be decoded within the controller 105 to verify whether or not the L1-post signaling received by the controller 105 is correct or not.

Figure 16:
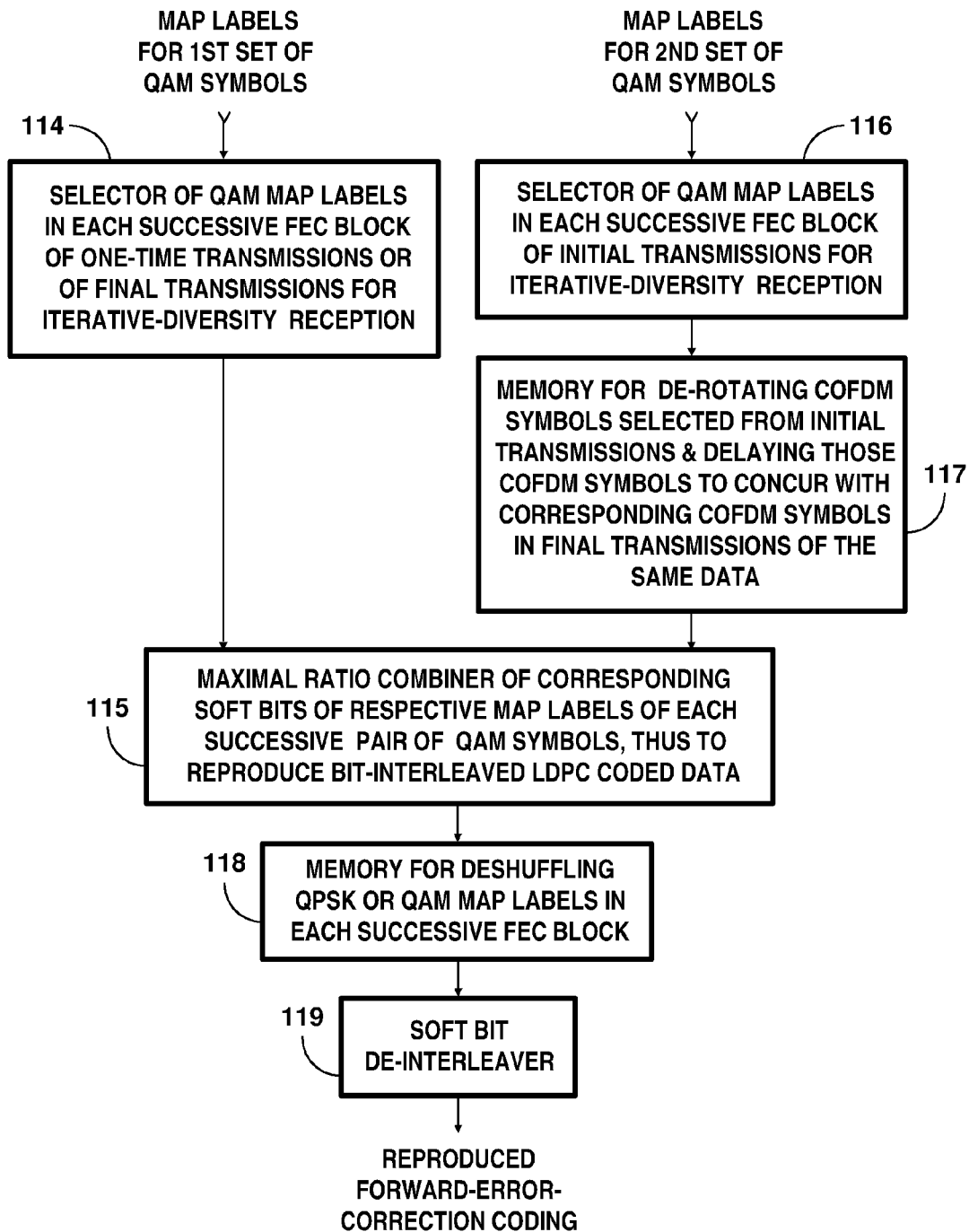

FIG. 16 depicts diversity combining apparatus for combining on one hand modified map labels for the first set of QAM symbols supplied from the adjuster 103 of soft-bit LLRs and on the other hand modified map labels for the second set of QAM symbols supplied from the adjuster 104 of soft-bit LLRs. More particularly, a selector 114 selects to a first of the two input ports of a maximal-ratio combiner 115 the QAM map labels from each successive FEC block of single-time transmissions or of final transmissions for itera-tive-diversity reception from the response of the adjuster 103 of soft-bit LLRs supplied to the input port of the selector 114. A selector 116 selects to the write input port of a memory 117 the QAM map labels from each successive FEC block of initial transmissions for iterative-diversity reception from the response of the adjuster 104 of soft-bit LLRs supplied to the input port of the selector 116. The read output port of the memory 117 connects with the second of the two input ports of the maximal-ratio combiner 115. The addressing of the memory 117 during its writing and subsequent reading is arranged such that the COFDM symbols selected from the initial transmissions for iterative-diversity reception are de-rotated and delayed to concur with corresponding COFDM symbols that the selector 114 selects from the final transmissions for iterative-diversity reception.

The output port of the maximal-ratio combiner 115 is connected for supplying response therefrom to the write input of a memory 118. The addressing of the memory 118 during its writing and subsequent reading is arranged so that the QPSK or QAM map labels in each successive FEC block are deshuffled in its read output signal. (This deshuffling compensates for shuffling the order of cells with each FEC block performed by the interleavers 34, 44, 55 etc. in the FIG. 2 portion of the COFDM transmitter depicted in FIGS. 1, 2, 3 and 4.) The read output port of the memory 118 is connected for supplying deshuffled map labels to the input port of a bit de-interleaver 197, the output port of which reproduces forward-error-correction (FEC) coding responsive to those deshuffled map labels.

Maximal-ratio combining of separately transmitted QAM symbols is recognized as being superior to all other well-known types of diversity combining when those signals are afflicted by AWGN, atmospheric noise, Johnson noise within the receiver, or imperfect filtering of power from an alternating-current power source. However, maximal-ratio combining of frequency-diverse QAM signals performs less satisfactorily when one QAM signal is corrupted by burst noise or in-channel interfering signal and the other is not. Signal-selective methods of diversity combining are less disrupted by one QAM signal being corrupted by burst noise or in-channel interfering signal while the other is not. Designing diversity combining that can accommodate all the conditions of adverse reception described supra has been a challenging problem.

The frequency-domain equalization of QAM map coordinates ordinarily employed in a COFDM receiver boosts the levels of selectively faded frequency-diverse QAM components of COFDM symbols. This dilutes maximum-ratio combining towards equal-power combining. Noise components generated within the receiver are amplified together with boosting the selectively faded QAM, resulting in low effective SNRs. These amplified noise components can tax the data-slicing capabilities of a QAM demapper severely, especially for the less robust bits in QAM labels. The adjusters 103 and 104 of soft-bit LLRs in FIG. 14 are configured to reduce the LLR confidence levels of the less robust soft bits of reproduced QAM labels, responsive to substantial boosting of the amplitudes of the QAM constellations that give rise to those labels. To further such operation, the pilot carriers processor 98 in FIG. 14 provides each of the adjusters 103 and 104 of LLRs with information concerning the relative amplitudes of the QAM symbols in the first and second sets of them. Preferably, as channel equalization boosts gain more for one of a pair of QAM constellations that convey similar segments of bit-interleaved coded data than for the other, the LLRs of more soft bits of its QAM label are reduced, including increasingly robust ones of those soft bits. This selective LLR reduction procedure causes the maximal-ratio combiner 115 in FIG. 16 to rely less on the one of a pair of QAM symbols that convey similar segments of bit-interleaved coded data, which QAM symbol is more selectively-faded than the other one of that pair of QAM symbols. The more robust soft bits of the QAM label of the more selectively faded one of the pair of QAM symbols apt to have reasonably good SNR still figure significantly in the results of combining supplied from the maximal-ratio combiner 115. However, the less robust soft bits of the QAM label of the more selectively faded one of the pair of QAM symbols apt to have poor SNR will figure less significantly, if at all, in the results of combining supplied from the maximal-ratio combiner 115.

Burst noise customarily drives the analog-to-digital conversion in a QAM demapper out of normal range, adversely affecting its data-slicing capabilities. This adverse effect is detectable by the pilot carriers processor 98 depicted in FIG. 14, which processor 98 supplies control signals to the frequency-domain channel equalizer 99.

The pilot carriers processor 98 in FIG. 14 further provides the adjuster 103 of LLRs with indications as to whether the map label of a currently unmapped QAM symbol is very likely to be in error for being out of normal range of the complex analog-to-digital converter in the one of the bank 101 of demappers selected for processing the currently received first set of QAM symbols. Responsive to such an indication the adjuster 103 of LLRs reduces to zero the LLRs of soft bits of QAM map labels affected by the analog-to-digital conversions in the QAM demapper 101 being out of normal range. If the analog-to-digital conversions in the QAM demapper 102 are within normal range at the same time, the maximal-ratio combiner 115 in FIG. 16 will be conditioned to function as a signal-selective diversity combiner, reproducing the soft bits of QAM symbols from the QAM demapper 101.

The pilot carriers processor 98 in FIG. 14 further provides the adjuster 104 of LLRs with indications as to whether the map label of a currently unmapped QAM symbol is very likely to be in error for being out of normal range of the complex analog-to-digital converter in the one of the bank 102 of demappers selected for processing the currently received second set of QAM symbols. Responsive to such an indication the adjuster 104 of LLRs reduces to zero the LLRs of soft bits of QAM map labels affected by the analog-to-digital conversions in the QAM demapper 102 being out of normal range. If the analog-to-digital conversions in the QAM demapper 101 are within normal range at the same time, the maximal-ratio combiner 115 in FIG. 16 will be conditioned to function as a signal-selective diversity combiner, reproducing the soft bits of QAM symbols from the QAM demapper 101.

Sustained narrow-band co-channel interference (CCI) can cause the frequency-domain channel equalizer to reduce gain a lot for the OFDM carriers of affected frequencies. Such large reduction in gain keeps analog-to-digital conversion in the affected one of the QAM mappers 101 and 102 within normal range, but causes error in its unmapping. When the pilot carriers processor 98 in FIG. 14 provides indications that the frequency-domain channel equalizer will reduce gain much more for the affected frequencies than for other frequencies, these indications condition the maximal-ratio combiner 115 in FIG. 16 to function as a signal-selective diversity combiner, reproducing the soft bits of map labels from the one of the QAM demappers 101 and 104 not affected by the sustained narrow-band CCI. The responses of the frequency-domain channel equalizer to burst noise and to sustained narrow-band CCI differ, because the responses of the pilot carriers processor 98 to respective OFDM carriers are averaged over a few COFDM symbol intervals. The control signals supplied from the pilot carriers processor 98 that condition the maximal-ratio combiner 115 to function as a signal-selective diversity combiner are supplied on a COFDM symbol by COFDM symbol basis. The control signals are similar, whether the OFDM carriers are affected by sustained CCI, giving the frequency-domain channel equalizer plenty of time to respond, or are instead momentarily affected by burst noise, so the channel equalizer 99 has insufficient time to respond fully.

FIG. 17 indicates that forward-error-correction coding reproduced from the read-output port of the soft bit de-interleaver 119 is applied to the input port of an iterative soft-input/soft-output (SISO) decoder 120 for LDPC coding. FIG. 17 further shows the output port of the decoder 120 connected for supplying the results of its decoding LDPC coding to the input port of a decoder 121 of BCH coding. FIG. 17 shows a control connection 122 from the decoder 121 of BCH coding back to the decoder 120 of LDPC coding, through which connection 122 the decoder 121 sends an indication of when it has decoded a correct BCH codeword. This indication signals the decoder 120 of LDPC coding that it can discontinue iterative decoding before reaching a limit on the maximum number of iterations permitted, which early discontinuation of iterative decoding conserves power consumption by the receiver. The output port of the decoder 121 is connected for supplying the results of its decoding BCH coding to the input port of a BB Frame descrambler 123, which typically includes a de-jitter buffer and null-packet re-inserter which are not explicitly shown.

FIG. 17 shows the output port of the BB Frame descrambler 123 connected to supply IP packets to the input port of an internet-protocol packet parser 124. The output port of the IP packet parser 124 is connected to supply IP packets to a packet sorter 125 for sorting IP packets according to their respective packet identifiers (PIDs) to one of the respective input ports of apparatus 126 for utilizing video data packets, apparatus 127 for utilizing audio data packets, and apparatus 128 for utilizing ancillary data packets.

FIG. 17 depicts a single SISO decoder 120 for LDPC coding in cascade connection with a single decoder 121 for BCH coding thereafter. In actual practice there are apt to be at least two such cascade connections available, suitable to respective different sizes of FEC code blocks, with one of these cascade connections selected for supplying decoded data to the input port of the BB frame descrambler 1230 in accordance with instructions from the controller 105.

Not all COFDM communication systems will concatenate BCH coding with LDPC coding. Cyclic redundancy check (CRC) coding can be used instead of BCH coding for detecting the successful conclusion of LDPC decoding. In such case, the general structure of COFDM receiver apparatus depicted in FIGS. 14, 15, 16 and 17 is modified to replace the decoder 121 for BCH coding with a decoder for CRC coding. However, unlike the decoder 121 for BCH coding, the decoder for CRC coding will not be capable of correcting remnant errors from iterative decoding of LDPC coding. LDPC coding that lends itself to being successfully decoded in a few iterations will allow the decoder 121 to be replaced by direct connection from the SISO decoder 120 to the input port of the BB Frame descrambler 123. Alternatively, decoders for other types of FEC coding replace the decoders 120 and 121 in other receiver apparatus embodying aspects of the invention. For example, a cascade connection of decoders for concatenated RS and turbo coding is used instead of the decoders 120 and 121.

FIG. 18 is a schematic diagram of a modification of the FIG. 14 portion of the COFDM receiver apparatus depicted in FIGS. 14, 15, 16 and 17. This modification of COFDM receiver apparatus unmaps both transmissions of the iterative-diversity COFDM signals using a single bank 130 of demappers for both first and second sets of QAM symbols, rather than separate banks 101 and 102 of demappers for initial transmissions of the iterative-diversity COFDM signals on one hand and on the other hand for final transmissions of the iterative-diversity COFDM signals. The FIG. 18 portion of the receiver apparatus resembles the FIG. 14 portion of the COFDM receiver apparatus in regard to the structure and operation of elements 90 through 100. The FIG. 18 portion of the COFDM receiver apparatus omits the elements 101 through 104 depicted in FIG. 14. FIGS. 18 and 15 indicate that the response of the bank 100 of parallel-to-series converters is supplied directly to a demapper 106 of FEC-coded L1-pre signaling and to a demapper 109 of FEC-coded L1-post signaling, which demappers are depicted in FIG. 15.

FIG. 18 shows the output port of the bank 130 of demappers for both first and second sets of QAM symbols connected to the input port of an adjuster 131 of the logarithmic likelihood ratios (LLRs) of the soft bits supplied from the bank 130 of demappers. The pilot carriers processor 98 provides the adjuster 131 of LLRs with indications as to whether the map label of a currently unmapped QAM symbol is very likely to be in error for being out of normal range of the complex analog-to-digital converter in the one of the bank 130 of demappers selected for processing the currently received QAM symbols. The output port of the adjuster 131 of soft-bit LLRs connects to the input port of the selector 114 in FIG. 16, which selector 114 selects to the first input port of the maximal-ratio combiner 115 the first set of QAM map labels from each successive FEC block of single-time transmissions or of final transmissions for iterative-diversity reception. The output port of the adjuster 131 of soft-bit LLRs is further connected to the write input ports of a bank 132 of pairs of soft-bit memories, one of which pairs of soft-bit memories is selected by control signal from the controller 105 shown in FIG. to be alternately written by successive QAM map labels of a particular size. Each one of the selected pair of those soft-bit memories is arranged to be alternately read while the other of them is written The read output input ports of the selected pair of soft-bit memories connect through tri-state connection to the output port of the bank 132 of pairs of soft-bit memories and thence to the input port of the selector 116 in FIG. 16. The selector 116 selects to the write input port of the memory 117 the second set of QAM map labels from each successive FEC block of initial transmissions for iterative-diversity reception. The memory 117 is configured for de-rotating and delaying the COFDM symbols selected from these initial transmissions so as to concur with corresponding COFDM symbols that the selector 114 selects from the final transmissions for iterative-diversity reception. The read output port of the memory 117 supplies these de-rotated and delayed COFDM symbols to the second input port of the maximal-ratio combiner 115.

As noted supra, U.S. Pat. No. 7,236,548 asserts that maximal-ratio combining the results of unmapping two similar QAM symbol constellations at the bit level increases the effective SNR for the AWGN channel by an additional 2.5 dB or so over the 3 dB increase achieved by maximal-ratio combining the complex coordinates of the similar QAM symbol constellations before unmapping them. Maximal-ratio combining the results of unmapping two conjugate Gray-mapped QAM symbol constellations at the bit level will also increase the effective SNR for the AWGN channel appreciably over maximal-ratio combining those results at symbol level. To help understand why this is so, consider conjugate pair of Gray mappings of 16QAM. The initial two bits of a 16QAM map label define a QPSK symbol in the FIG. 8 first Gray map of 16QAM. These bits will tend to dominate the initial two bits of the 16QAM map label from the FIG. 9 second Gray map of 16QAM in determining the response of maximal-ratio combiner 116, operative at bit level. The final two bits of a 16QAM map label define a QPSK symbol in the FIG. 9 second Gray map of 16QAM. These bits will tend to dominate the final two bits of the 16QAM map label from the FIG. 8 first Gray map of 16QAM in determining the response of maximal-ratio combiner 116, operative at bit level. All four bits of the 16QAM map label reproduced in the response of maximal-ratio combiner 116 will tend to have logarithmic likelihood ratios of being correct close to those for QPSK, rather than just two of these bits. The minimum SNR required in the AWGN channel for satisfactory reception to be maintained is reduced almost 6 dB compared to a single transmission of 16QAM, but digital payload is halved.

More interesting perhaps, is consideration of transmitting iterative-diversity 256QAM instead of transmitting 16QAM once. The initial four bits of a 256QAM map label define a 16QAM symbol in the first Gray map of 256QAM depicted in FIGS. 12($a$), 12($b$), 12($c$) and 12($d$). These bits will tend to dominate the initial four bits of the 256QAM map label from the second Gray map of 256QAM depicted in FIGS. 13($a$), 13($b$), 13($c$) and 13($d$) when determining the response of maximal-ratio combiner 116, operative at bit level. The final four bits of a 256QAM map label define a 16QAM symbol in the second Gray map of 256QAM depicted in FIGS. 13($a$), 13($b$), 13($c$) and 13($d$). These bits will tend to dominate the final four bits of the 256QAM map label from the first Gray map of 256QAM depicted in FIGS. 12($a$), 12($b$), 12($c$) and 12($d$) when determining the response of maximal-ratio combiner 116, operative at bit level. All eight bits of the 256QAM map label reproduced in the response of maximal-ratio combiner 116 will tend to have logarithmic likelihood ratios of being correct close to those for 16QAM, rather than just four of these bits. The minimum SNR required in the AWGN channel for satisfactory reception to be maintained is reduced almost 6 dB compared to a single transmission of 256QAM, but digital payload is halved.

Iterative-diversity transmissions of 1024QAM can be used instead of sole transmission of 64QAM. While the embodiments of the invention specifically described supra employ square QAM symbols, other embodiments of the invention are possible which employ cruciform QAM symbols, such as 32QAM or 512QAM.

While COFDM receivers that are preferred embodiments of the invention are described herein, persons skilled in the art of designing COFDM receiver for DTV and benefiting from acquaintance with this document can design alternative receivers embodying the invention. For example, the adjustment of the LLRs of the soft bits of the map labels for QAM symbols in the initial transmissions of the iterative diversity signals can be deferred until after de-rotation and delay of COFDM symbols from those initial transmissions. Such design is not preferred since it requires extra memory to delay spectral information from the pilot and TPS carriers processor in order to implement the adjustment of the LLRs of the soft bits of those map labels. Alternative embodiments of the invention which maximal-ratio combine at bit level corresponding map labels from unmapping QAM symbols of the initial transmissions of iterative-diversity DTV signals and from unmapping QAM symbols of the final transmissions of those iterative-diversity DTV signals should be considered to be within the scope of broader ones of the appended claims, in accordance with the Doctrine of Equivalency established by the courts. It is noted that the invention reduces the need for bit-interleaving FEC coding, especially for smaller-size QAM symbol constellations.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A receiver for iterative-diversity reception of a selected one of modulated radio-frequency carrier waves, each comprising a plurality of coded orthogonal frequency-division multiplexed (COFDM) modulated subcarriers for transmitting forward-error-correction (FEC) coded digital signals twofold in time-division multiplex, COFDM symbols of initial transmissions of said FEC-coded digital signals being time-interleaved with COFDM symbols of final transmissions of the same said FEC-coded digital signals occurring a prescribed time interval later, said FEC-coded digital signals mapping to a first set of plural-amplitude-level symbol constellations in COFDM symbols of final transmissions of said FEC-coded digital signals and to a second set of plural-amplitude-level symbol constellations in COFDM symbols of initial transmissions of said FEC-coded digital signals, said receiver comprising:
   a tuner for receiving and demodulating said selected one of said modulated radio-frequency carrier waves to generate a baseband digitized COFDM signal;
   a unit for removing any guard intervals from said baseband digitized COFDM signal;
   a computer for computing the discrete Fourier transform (DFT) of said baseband digitized COFDM signal from which any said guard intervals thereof are removed, thereby to recover complex-coordinate descriptions of said plural-amplitude-level symbol constellations in both said first and said second sets thereof;
   a frequency-domain channel equalizer configured for supplying equalized complex-coordinate descriptions of said plural-amplitude-level symbol constellations responsive to said complex-coordinate descriptions of said plural-amplitude-level symbol constellations recovered by said computer for computing the DFT of said baseband digitized COFDM signal;
   demapper apparatus for unmapping said equalized complex-coordinate descriptions of said plural-amplitude-level symbol constellations successively, to recover first "soft" FEC-coded digital signals from said final transmissions of said FEC-coded digital signals and, to recover corresponding second "soft" FEC-coded digital signals from said initial transmissions of said FEC-coded digital signals;
   memory configured for delaying said second "soft" FEC-coded digital signals recovered from said initial transmissions thereof to concur with said first "soft" FEC-coded digital signals recovered from said final transmissions thereof;
   a maximal-ratio combiner connected for maximal-ratio combining said first "soft" FEC-coded digital signals recovered from said final transmissions thereof with concurring delayed said "soft" FEC-coded digital signals recovered from said initial transmissions thereof, said maximal-ratio combiner configured to perform said maximal-ratio combining at bit level on individual bits to generate a combined "soft" FEC-coded digital signal;
   a de-interleaver for de-interleaving said combined "soft" FEC-coded digital signal;
   decoder apparatus connected for decoding de-interleaved said combined "soft" FEC-coded digital signal, thereby to reproduce said digital signal; and
   further portions of said receiver configured for utilizing said digital signal as so reproduced.

2. A receiver as set forth in claim 1, wherein said demapper apparatus comprises:
   a first demapper for unmapping bits of said FEC-coded digital signals mapping in a first way to plural-amplitude-level symbol constellations in COFDM symbols of final transmissions of said FEC-coded digital signals, and
   a second demapper for unmapping bits of said FEC-coded digital signals mapping in a second way to plural-amplitude-level symbol constellations in COFDM symbols of initial transmissions of said FEC-coded digital signals respectively preceding said final transmissions thereof, the more robust bits of lattice-point labels in the first way of mapping being the less robust bits of similar lattice-point labels in the second way of mapping, and the more robust bits of lattice-point labels in the second way of mapping being the less robust bits of lattice-point labels in the first way of mapping.

3. A receiver as set forth in claim 2, wherein said demapper apparatus comprises:
   a parallel-to-serial converter connected for receiving said equalized complex-coordinate descriptions of said plural-amplitude-level symbol constellations from said frequency-domain channel equalizer and configured for reproducing said equalized complex-coordinate descriptions of said plural-amplitude-level symbol constellations successively in a response therefrom;
   a first demapper included within said demapper apparatus, for unmapping bits of said FEC-coded digital signals mapping in said first way to plural-amplitude-level symbol constellations in COFDM symbols of final transmissions of said FEC-coded digital signals, said first demapper configured for originating said first "soft" FEC-coded digital signals responsive to successive equalized complex-coordinate descriptions of said plural-amplitude-level symbol constellations recovered from the COFDM symbols of said final transmissions of the same said FEC-coded digital signals, as supplied from said parallel-to-serial converter; and
   a second demapper included within said demapper apparatus, for unmapping bits of said FEC-coded digital signals mapping in said second way to plural-amplitude-level symbol constellations in COFDM symbols of initial transmissions of said FEC-coded digital signals, said second demapper configured for originating said second "soft" FEC-coded digital signals to successive equalized complex-coordinate descriptions of said plural-amplitude-level symbol constellations recovered from the COFDM symbols of said initial transmissions of the same said FEC-coded digital signals, as supplied from said parallel-to-serial converter.

4. A receiver as set forth in claim 3, further comprising:
an adjuster of the logarithmic likelihood ratios of said first "soft" FEC-coded digital signals to compensate for their frequency-domain equalization by said frequency-domain channel equalizer, said adjuster of the logarithmic likelihood ratios of said first "soft" FEC-coded digital signals in cascade connection after said first demapper within said means for unmapping bits of said FEC-coded digital signals mapping in said first way, said adjuster of the logarithmic likelihood ratios of said first "soft" FEC-coded digital signals configured for modifying said first "soft" FEC-coded digital signals originating from said first demapper before their subsequent application as a first input signal to said maximal-ratio combiner; and
an adjuster of the logarithmic likelihood ratios of said second "soft" FEC-coded digital signals to compensate for their frequency-domain equalization by said frequency-domain channel equalizer, said adjuster of the logarithmic likelihood ratios of said second "soft" FEC-coded digital signals in cascade connection after said second demapper within said means for unmapping bits of said FEC-coded digital signals mapping in said second way, said adjuster of the logarithmic likelihood ratios of said second "soft" FEC-coded digital signals configured for modifying said second "soft" FEC-coded digital signals originating from said second demapper before their subsequent application as a second input signal to said maximal-ratio combiner.

5. A receiver as set forth in claim 1, wherein said demapper apparatus comprises:
a parallel-to-serial converter connected for receiving said equalized complex-coordinate descriptions of said plural-amplitude-level symbol constellations from said frequency-domain channel equalizer and configured for reproducing said equalized complex-coordinate descriptions of said plural-amplitude-level symbol constellations successively in a response therefrom;
a demapper configured for supplying successive map labels respectively responsive to successive ones of said equalized complex-coordinate descriptions of said plural-amplitude-level symbol constellations successively supplied from said parallel-to-serial converter;
a selector of said first "soft" FEC-coded digital signals from those of said successive map labels supplied by said demapper responsive to successive ones of said equalized complex-coordinate descriptions of said plural-amplitude-level symbol constellations recovered from the COFDM symbols of said final transmissions of the same said FEC-coded digital signals; and
a selector of said second "soft" FEC-coded digital signals from those of said successive map labels supplied by said demapper responsive to successive ones of said equalized complex-coordinate descriptions of said plural-amplitude-level symbol constellations recovered from the COFDM symbols of said initial transmissions of the same said FEC-coded digital signals, the order of bits in each of said successive map labels in just one of said first and said second "soft" FEC-coded digital signals being reversed in time before being combined in said maximal-ratio combiner with a respective one of said successive map labels in the other of said first and said second "soft" FEC-coded digital signals.

6. A receiver as set forth in claim 5, wherein said memory configured for delaying said second "soft" FEC-coded digital signals recovered from said initial transmissions thereof to concur with said first "soft" FEC-coded digital signals recovered from said final transmissions thereof comprises:
a pair of random-access memories alternately written with successive map labels of at least those of said successive map labels of said second "soft" FEC-coded digital signals, said pair of random-access memories each configured to be read after its writing to provide alternate ones of said successive map labels of said second "soft" FEC-coded digital signals.

7. A receiver as set forth in claim 1, wherein said demapper apparatus comprises:
a parallel-to-serial converter connected for receiving said equalized complex-coordinate descriptions of said plural-amplitude-level symbol constellations from said frequency-domain channel equalizer and configured for reproducing said equalized complex-coordinate descriptions of said plural-amplitude-level symbol constellations successively in a response therefrom;
a demapper configured for supplying successive map labels respectively responsive to successive ones of said equalized complex-coordinate descriptions of said plural-amplitude-level symbol constellations successively supplied from said parallel-to-serial converter;
an adjuster of the logarithmic likelihood ratios (LLRs) of the bits of said successive map labels supplied from said demapper, thus to supply adjusted successive map labels;
a selector of said first "soft" FEC-coded digital signals from those of said adjusted successive map labels supplied by said adjuster of LLRs responsive to successive ones of said equalized complex-coordinate descriptions of said plural-amplitude-level symbol constellations recovered from the COFDM symbols of said final transmissions of the same said FEC-coded digital signals; and
a selector of said second "soft" FEC-coded digital signals from those of said adjusted successive map labels supplied by said adjuster of the logarithmic likelihood ratios (LLRs) of the bits of said successive map labels supplied from said demapper, the order of bits in each of said adjusted successive map labels in just one of said first and said second "soft" FEC-coded digital signals being reversed in time before being combined in said maximal-ratio combiner with a respective one of said adjusted successive map labels in the other of said first and said second "soft" FEC-coded digital signals.

8. A receiver as set forth in claim 7, wherein said wherein said memory configured for delaying said second "soft" FEC-coded digital signals recovered from said initial transmissions thereof to concur with said first "soft" FEC-coded digital signals recovered from said final transmissions thereof comprises:
a pair of random-access memories alternately written with successive adjusted map labels of said second "soft" FEC-coded digital signals, said pair of random-access memories each configured to be read after its writing to provide alternate ones of said successive adjusted map labels of said second "soft" FEC-coded digital signals.

9. A receiver as set forth in claim 1, further comprising:
means for adjusting the log likelihood ratios of soft bits of said "soft" FEC-coded digital signals recovered from said final transmissions thereof, before application of said "soft" FEC-coded digital signals recovered from said final transmissions thereof to said maximal-ratio combiner as a first of two concurrent input signals thereto, and for adjusting the log likelihood ratios of soft bits of said "soft" FEC-coded digital signals recovered from said initial transmissions thereof, before application of said "soft" FEC-coded digital signals recovered from said final transmissions thereof to said maximal-ratio combiner as a second of two concurrent input signals thereto.

10. A receiver as set forth in claim 6, wherein said pair of random-access memories are configured to be alternately written and read, so as each to provide with reversed order of bits said successive map labels of said second "soft" FEC-coded digital signals.

11. A receiver as set forth in claim 8, wherein said pair of random-access memories are configured to be alternately written and read so as each to provide with reversed order of bits said successive map labels of said second "soft" FEC-coded digital signals.

* * * * *